US012750610B2

(12) United States Patent
Shin

(10) Patent No.: US 12,750,610 B2
(45) Date of Patent: Sep. 29, 2026

(54) IMAGE SENSING SYSTEM AND OPERATING METHOD THEREOF

(71) Applicant: SAMSUNG ELECTRONICS CO., LTD., Suwon-si (KR)

(72) Inventor: Deok Ha Shin, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 19/089,914

(22) Filed: Mar. 25, 2025

(65) Prior Publication Data

US 2026/0032362 A1 Jan. 29, 2026

(30) Foreign Application Priority Data

Jul. 25, 2024 (KR) ........................ 10-2024-0098551

(51) Int. Cl.

| | |
|---|---|
| ***H04N 23/65*** | (2023.01) |
| ***H04N 7/01*** | (2006.01) |
| ***H04N 25/76*** | (2023.01) |
| ***H04N 25/78*** | (2023.01) |
| *H04N 23/00* | (2023.01) |

(52) U.S. Cl.

CPC ............. *H04N 25/78* (2023.01); *H04N 7/014* (2013.01); *H04N 25/7795* (2023.01)

(58) Field of Classification Search

CPC .. H04N 23/65; H04N 25/134; H04N 25/7795; H04N 25/78; H04N 7/014; H04N 23/00; H04N 25/00; H04N 2101/00

USPC ................................ 348/41, 64, 69, 79, 177

See application file for complete search history.

(56) References Cited

U.S. PATENT DOCUMENTS

| | | | | |
|---|---|---|---|---|
| 7,030,911 | B1 | 4/2006 | Kubo | |
| 10,477,126 | B1 * | 11/2019 | Xu | H04N 25/627 |
| 2008/0284871 | A1 | 11/2008 | Kobayashi | |
| 2011/0007939 | A1 | 1/2011 | Teng et al. | |
| 2019/0026901 | A1 * | 1/2019 | Fu | G06T 7/70 |
| 2019/0229138 | A1 * | 7/2019 | Lee | H10F 39/809 |
| 2019/0268559 | A1 * | 8/2019 | Kondo | H04N 25/709 |

FOREIGN PATENT DOCUMENTS

| | | | |
|---|---|---|---|
| CN | 108718393 | A | 10/2018 |
| JP | 2014-116762 | A | 6/2014 |
| KR | 10-2004-0082896 | A | 9/2004 |
| KR | 10-2013-0079114 | A | 7/2013 |

* cited by examiner

*Primary Examiner* — Daquan Zhao

(74) *Attorney, Agent, or Firm* — Sughrue Mion, PLLC

(57) ABSTRACT

An image sensing system includes a first subpixel array including a first pixel and a second pixel, connected to a first column line, and a second subpixel array including a third pixel and a fourth pixels, connected to a second column line, a readout circuit connected to the first and second column lines, read out in an order of the first pixel and the second pixel, and read out in an order of the third pixel and the fourth pixel, and output image data based on output signals from the first to fourth pixels, and an image signal processor configured to generate metadata related to a motion vector of an object based on the image data. A start time point of an integration time is the same for the first pixel and the third pixel, and the same for the second pixel and the fourth pixel.

12 Claims, 39 Drawing Sheets

1000

IMAGE SENSING SYSTEM AND OPERATING METHOD THEREOF

CROSS-REFERENCE TO RELATED APPLICATION

This application claims priority from Korean Patent Application No. 10-2024-0098551 filed on Jul. 25, 2024 in the Korean Intellectual Property Office and all the benefits accruing therefrom under 35 U.S.C. 119, the disclosure of which is herein incorporated by reference in its entirety.

BACKGROUND

1. Field

The disclosure relates to an image sensing system and an operating method thereof.

2. Description of Related Art

An image sensing device is a semiconductor device that converts optical information into an electrical signal. The image sensing device may include a charge coupled device (CCD) image sensing device and a complementary metal-oxide semiconductor (CMOS) image sensing device.

The CMOS image sensing device may be abbreviated as a CIS (CMOS image sensor). The CIS may include a plurality of pixels that are two-dimensionally arranged. Each of the plurality of pixels may include, for example, a photodiode (PD). The photodiode may serve to convert incident light into an electrical signal.

Recently, with the development of computer industry and communication industry, a demand for an image sensor having improved performance has been increased in various fields such as a digital camera, a camcorder, a smart phone, a game device, a security camera, a medical micro camera and a robot.

SUMMARY

One or more example embodiments of the disclosure may provide an image sensing system in which a power saving mode is implemented.

One or more example embodiments of the disclosure may provide an operating method of an image sensing system in which a power saving mode is implemented.

The objects of the disclosure are not limited to those mentioned above and additional objects of the disclosure, which are not mentioned herein, will be clearly understood by those skilled in the art from the following description of the disclosure.

According to an aspect of the disclosure, there is provided an image sensing system including: a pixel array including a first subpixel array and a second subpixel array, the first subpixel array including a first pixel and a second pixel and the second subpixel array including a third pixel and a fourth pixel; a first column line connected to the first pixel and the second pixel; a second column line connected to the third pixel and the fourth pixel, the second column line being different from the first column line; a readout circuit connected to the first and the second column lines, the readout circuit being configured to receive output signals from the first to the fourth pixels and configured to output image data based on the output signals; and an image signal processor configured to generate metadata related to a motion vector of an object included in the image data by performing an interpolation based on the image data, wherein the readout circuit is configured to read out pixels connected to the first column line in an order of the first pixel and the second pixel, and is configured to read out pixels connected to the second column line in an order of the third pixel and the fourth pixel, wherein a start time point of an integration time for the first pixel is the same as a start time point of an integration time for the third pixel, and wherein a start time point of an integration time for the second pixel is the same as a start time point of an integration time for the fourth pixel.

According to an aspect of the disclosure, there is provided an image sensing system including: an image sensor configured to generate image data by capturing an object; an image signal processor configured to perform image processing on the image data received from the image sensor and configured to generate metadata related to a motion vector of the object based on a result of the image processing; and a timing generator control circuit configured to receive the metadata from the image signal processor and configured to generate a control signal based on the metadata, wherein the image sensor includes: a pixel array including a plurality of pixels; a row driver circuit; at least one row line connected to the row driver circuit and extending in a first direction; a first pixel, a second pixel, a third pixel and a fourth pixel, which are connected to the at least one row line; a first column line connected to the first pixel and the third pixel, the first column line extending in a second direction intersecting with the first direction; a second column line connected to the second pixel and the fourth pixel, the second column line extending in the second direction and different from the first column line; a readout circuit connected to the first column line and the second column line, configured to receive output signals from the first to the fourth pixels, and configured to output the image data based on the output signals; and a timing generator configured to transmit an operation timing reference signal to the row driver circuit based on the control signal received from the timing generator control circuit, wherein the image signal processor is configured to perform image processing on the image data based on a readout order between the first pixel and the third pixel and a readout order between the second pixel and the fourth pixel.

According to an aspect of the disclosure, there is provided an operating method of an image sensing system, the operating method including: generating, by an image sensor, image data by sensing a captured object; performing, by an image signal processor, image processing on the image data; generating, by the image signal processor, metadata related to a motion vector of the captured object based on a result of the image processing; receiving, by a timing generator control circuit, the metadata and generating a control signal for controlling a timing generator based on the received metadata; and adjusting, by the timing generator, a start time point of an integration time of pixels included in the image sensor based on the control signal, wherein the adjusting includes increasing, by the timing generator, an interval between a first time point and a second time point based on the control signal with respect to a first pixel and a third pixel, for which a start time point of an integration time is the first time point, and with respect to a second pixel and a fourth pixel, for which a start time point of an integration time is the second time point after the first time point, among the first to the fourth pixels included in the image sensor, wherein the first pixel and the second pixel are connected to a first column line, and wherein the third pixel and the fourth pixel are connected to a second column line different from the first column line.

It should be noted that the effects of the disclosure are not limited to those described above, and other effects of the disclosure will be apparent from the following description.

BRIEF DESCRIPTION OF DRAWINGS

The above and other aspects and features of the disclosure will become more apparent by describing in detail example embodiments thereof with reference to the attached drawings, in which.

DETAILED DESCRIPTION

Hereinafter, an image sensing system and an operating method thereof according to some example embodiments will be described in detail with reference to the accompanying drawings.

Figure 1:
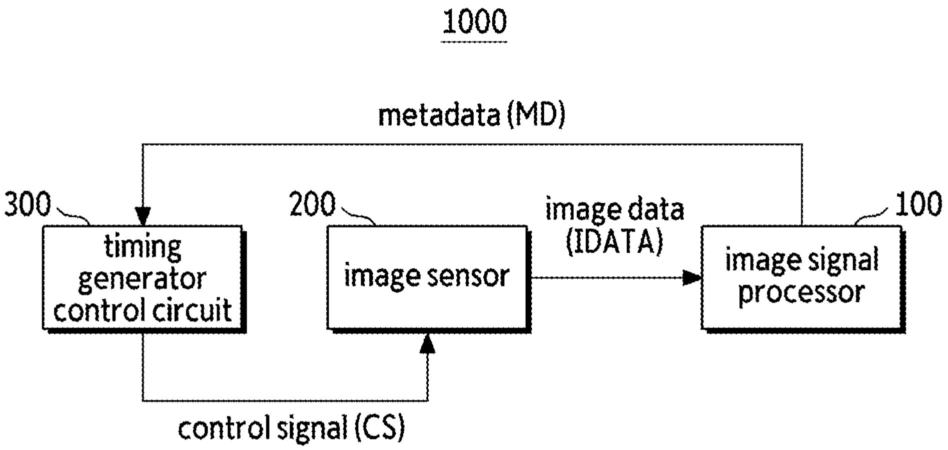
FIG. 1 is a view illustrating an image sensing system according to some embodiments.

FIG. 1 is a view illustrating an image sensing system according to some embodiments.

Referring to FIG. 1, an image sensing system 1000 may include an image sensor 200, an image signal processor 100 and a timing generator control circuit 300.

The image sensor 200 may generate image data IDATA by sensing a captured object. The image sensor 200 may be connected to the image signal processor 100 to provide the image data IDATA to the image signal processor 100. The image signal processor 100 may receive the image data IDATA from the image sensor 200 to perform image processing pm the image data IDATA.

The image signal processor 100 may be included in the image sensor 200 to perform image processing on the image data IDATA. However, an arrangement relationship between the image signal processor 100 and the image sensor 200 may vary depending on embodiments. For example, the image signal processor 100 may be separate from the image sensor 200.

The image signal processor 100 may perform interpolation for the image data IDATA. For example, the image signal processor 100 may perform interpolation such as upscaling or phase correction for the image data IDATA. The phase correction may be referred to as phase shift. The image signal processor 100 may calculate a motion vector of the object based on image data generated by performing interpolation for the image data IDATA.

For example, the image signal processor 100 may compare image data generated by performing the interpolation for the image data IDATA over time in accordance with movement of the object, thereby calculating speed and acceleration of the object. In addition, the image signal processor 100 may compare image data generated by performing the interpolation for the image data IDATA over time in accordance with movement of the object, thereby generating information on a moving path of the object. In this way, the image signal processor 100 may calculate a motion vector of the object to generate metadata MD including at least one of the speed of the object, the acceleration of the object, or the moving path of the object.

The image signal processor 100 may transmit the metadata MD to the timing generator control circuit 300. The timing generator control circuit 300 may generate a control signal CS for controlling a timing generator included in the image sensor 200 based on the received metadata MD.

Figure 2:
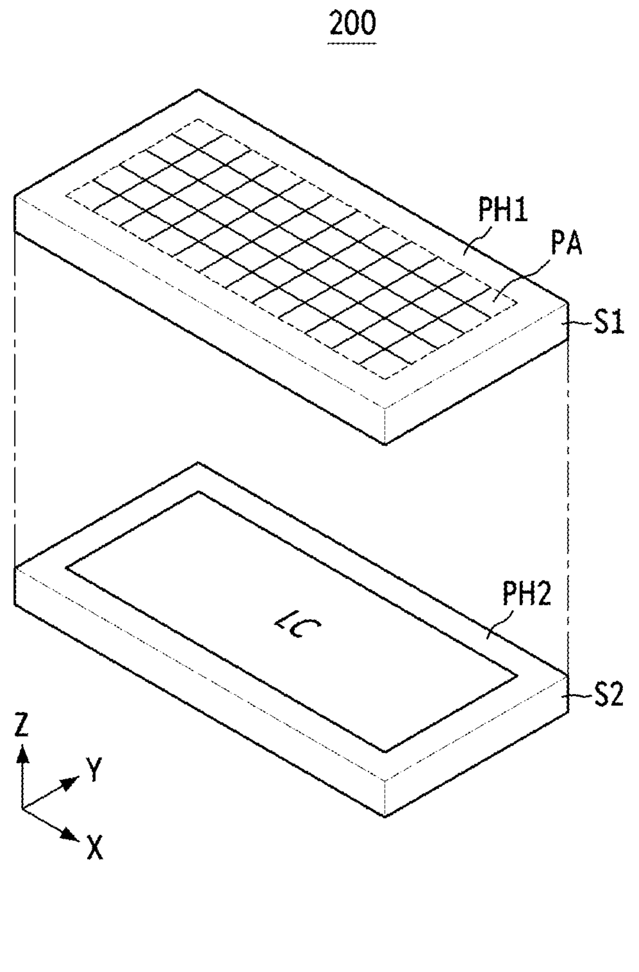
FIG. 2 is a view illustrating a conceptual layout of an image sensor according to some embodiments.

FIG. 2 is a view illustrating a conceptual layout of an image sensor according to some embodiments.

Referring to FIG. 2, the image sensor 200 may include a first area S1 and a second area S2, which are stacked in a third direction Z. The first area S1 and the second area S2 may extend in a first direction X and a second direction Y, which cross the third direction Z, and elements of the image sensor 200 may be disposed in the first area S1 and the second area S2.

In the following description, an upper surface or an upper portion will be described based on the third direction Z (e.g., (+) Z direction), and a lower surface or a lower portion will be described based on an opposite direction (e.g., (−) Z direction) of the third direction Z.

A third area in which a memory is disposed may be disposed below the second area S2. In this case, the memory disposed in the third area may receive image data from the first area S1 and the second area S2, store and/or process the image data and retransmit the image data to the first area S1 and the second area S2. In this case, the memory may include a memory device such as, for example but not limited to, a dynamic random access memory (DRAM) device, a static random access memory (SRAM) device, a spin transfer torque magnetic random access memory (STT-MRAM) device and a flash memory device. For example, when the memory includes a DRAM device, the memory may receive and process image data at a relatively high speed. Also, in some embodiments, the memory may be disposed in the second area S2.

The first area S1 may include a pixel array area PA and a first peripheral area PH1, and the second area S2 may include a logic circuit area LC, a second peripheral area PH2 and an image signal processor 100 (shown in FIG. 1). The first area S1 and the second area S2 may be sequentially stacked along the third direction Z.

In the first area S1, the pixel array area PA may correspond to a pixel array 270 that will be described later with reference to FIG. 3. The pixel array 270 may include a plurality of unit pixels arranged in a form of a matrix. Each pixel may include a photodiode and transistors.

The first peripheral area PH1 may include a plurality of pads, and may be disposed adjacent to the pixel array area PA. The plurality of pads may transmit and receive an electrical signal to and from an external device or the like.

In the second area S2, the logic circuit area LC may include electronic devices that include a plurality of transistors. The electronic devices included in the logic circuit area LC may be electrically connected to the pixel array area PA to provide a certain signal to each unit pixel of the pixel array area PA and/or control an output signal.

In the logic circuit area LC, for example, a timing generator 220, a row driver circuit 210, a ramp signal generating circuit 230, a readout circuit 240, a column driver circuit 280, an analog-to-digital converter (ADC) and a buffer circuit 260, which will be described later with reference to FIG. 3, may be disposed. For example, blocks other than the pixel array 270 may be disposed in the logic circuit area LC.

In the second area S2, the second peripheral area PH2 may be disposed in an area corresponding to the first peripheral area PH1 of the first area S1, but the embodiments are not limited thereto.

When the image signal processor 100 is included in the image sensor 200, the image signal processor 100 may be disposed in the second area S2 together with the logic circuit area LC and the second peripheral area PH2. In this case, the image signal processor 100 may receive the image data IDATA (shown in FIG. 1) from the buffer circuit 260, and may perform image processing on the received image data IDATA.

Figure 3:
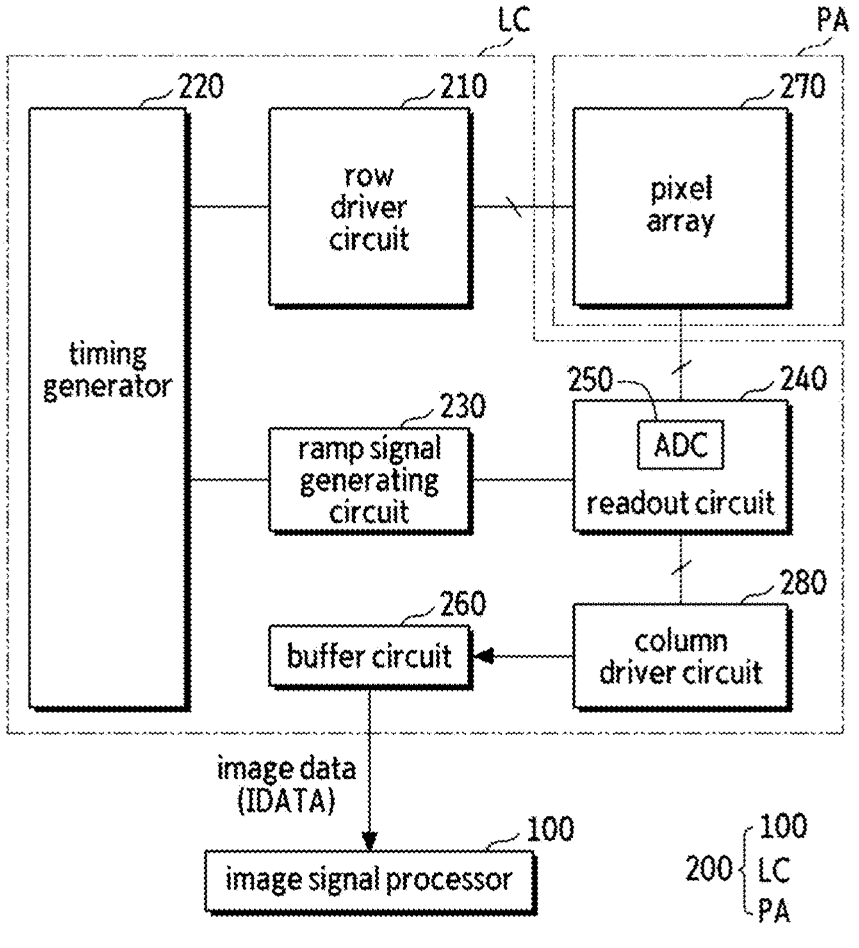
FIG. 3 is a view illustrating an image sensor according to some embodiments.

FIG. 3 is a view illustrating an image sensor according to some embodiments.

Referring to FIG. 3, the image sensor 200 may include a pixel array area PA and a logic circuit area LC. In this case, the pixel array area PA may be included in the first area S1 described above, and the logic circuit area LC may be included in the second area S2 described above. The pixel array area PA may perform analog signal processing for an analog signal, and the logic circuit area LC may perform analog signal processing and digital signal processing on the analog signal transferred from the pixel array area PA.

The pixel array area PA may include the pixel array 270. The logic circuit area LC may include the timing generator 220, the row driver circuit 210, the ramp signal generating circuit 230, the readout circuit 240, the column driver circuit 280, and the buffer circuit 260.

The image sensor 200 may sense an object captured through a lens under the control of the image signal processor 100, and the image signal processor 100 may output an image, sensed and output by the image sensor 200, to a display. In this case, the display may include any device capable of outputting an image. For example, the display may include a computer, a smartphone and any other image output terminals.

The pixel array 270 may include a plurality of pixels in the form of a matrix, which are respectively connected to a plurality of row lines and a plurality of column lines. Each of the plurality of pixels may include a red pixel configured to convert light in a red spectrum area into an electrical signal, a green pixel configured to convert light in a green spectrum area into an electrical signal and a blue pixel configured to convert light in a blue spectrum area into an electrical signal. Also, each color filter array configured to allow light in a specific spectrum area to pass therethrough may be arranged above each of the plurality of pixels included in the pixel array 270.

The pixel array 270 may include a plurality of photoelectric conversion elements, such as, for example but not limited to, a photodiode or a pinned photo diode. The pixel array 270 detects light by using the plurality of photoelectric conversion elements and converts the light into an electrical signal to generate an image signal.

The timing generator 220 may control an operation and/or timing of the row driver circuit 210, the analog-to-digital converter 250, the ramp signal generating circuit 230 and the column driver circuit 280 by outputting an operation timing reference signal such as a control signal or a clock signal to each of the row driver circuit 210, the analog-to-digital converter 250, the ramp signal generating circuit 230 and the column driver circuit 280.

The row driver circuit 210 may drive the pixel array 270. The row driver circuit 210 may allow a reset signal component and an image signal component to be output from the pixel of the pixel array 270. In this case, the row driver circuit 210 may not select only a specific row of the pixel array 270. For example, the row driver circuit 210 may allow all pixels of the pixel array 270 to output signals during a specific time period. That is, all pixels of the pixel array 270 may simultaneously output signals. In this case, the image sensor 200 may be referred to as a digital pixel sensor DPS, but the embodiment according to the disclosure is not limited thereto, and the row driver circuit 210 may select a specific row of the pixel array 270.

The ramp signal generating circuit 230 may generate and transmit a ramp signal to be used in the readout circuit 240. For example, the readout circuit 240 may include a correlated double sampler CDS, a comparator, and the analog-to-digital converter 250, and the ramp signal generating circuit 230 may generate and transmit a ramp signal to be used in the correlated double sampler, the comparator, and the analog-to-digital converter 250.

The readout circuit 240 may sample a pixel signal provided from the pixel array 270, compare the pixel signal with the ramp signal, and convert the analog image signal into a digital image signal based on the comparison result.

The analog-to-digital converter 250 may compare a reference signal provided from the ramp signal generating circuit 230 with the pixel signal provided from the pixel array 270 and output a comparison result signal. The analog-to-digital converter 250 may count the comparison result signal and output the same to the column driver circuit 280.

The column driver circuit 280 may temporarily store the received digital signal and perform computation for the received digital signal. The column driver circuit 280 may provide the computed digital signal to the image signal processor 100 via the buffer circuit 260.

In this case, the analog-to-digital converter 250 may process both the analog signal and the digital signal. In detail, a portion of the analog-to-digital converter 250 may convert the pixel signal into the digital signal, and another portion of the analog-to-digital converter 250 may compare the converted digital signal with the reference signal to output a comparison result signal, but the embodiment according to the disclosure is not limited thereto, and correlated double sampling may be performed in a separate block.

The buffer circuit 260 may include, for example, a latch unit. The buffer circuit 260 may temporarily store the image data IDATA to be provided to an outside and may transmit the image data IDATA to the image signal processor 100 (shown in FIG. 3). The image data IDATA provided from the buffer circuit 260 to the image signal processor 100 may be subjected to a predetermined image processing process by the image signal processor 100. Through such an image processing process, data output from the image signal processor 100 may be transmitted to an external memory or an external device.

Figure 4:
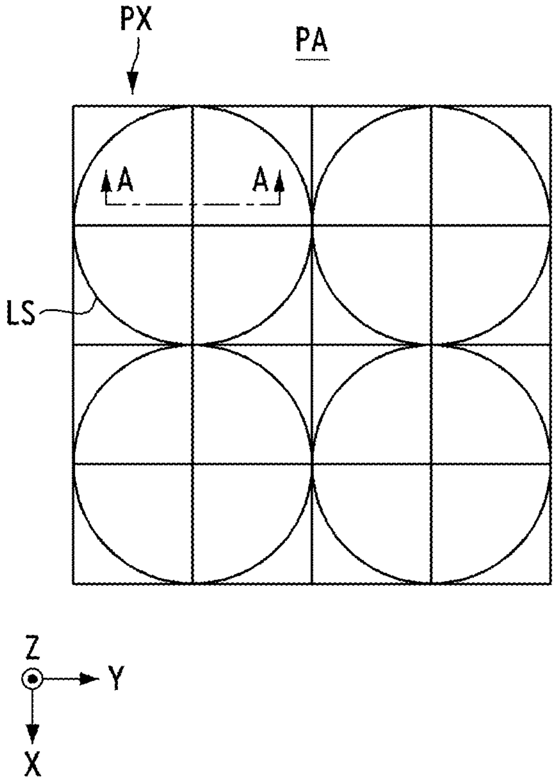
FIG. 4 is a view illustrating a pixel array according to some embodiments.

FIG. 4 is a view illustrating a pixel array according to some embodiments.

Referring to FIG. 4, the pixel array PA may include a plurality of unit pixels PX. The plurality of unit pixels PX may be two-dimensionally arranged. For example, the plurality of unit pixels PX may be repeatedly arranged in the first direction X and the second direction Y. The unit pixels PX may be arranged at constant intervals. For example, the pixel array PA may be arranged in a Bayer pattern, but the embodiment according to the disclosure is not limited thereto, and the pixel array PA may be arranged in a tetra pattern or a nona pattern. In the following description, an embodiment in which the pixel array PA is arranged in a quad Bayer pattern will be described by way of example, but the embodiment according to the disclosure is not limited thereto.

Referring to FIG. 4, the pixel array PA may include a plurality of unit pixels PX. A lens LS may cover the plurality of unit pixels PX. For example, one lens LS may cover four unit pixels PX. Also, a plurality of unit pixels PX corresponding to one lens LS may include the same type of a color filter. For example, the plurality of unit pixels PX covered by one lens LS may include one color filter among red, green and blue color filters. In this case, the color filter included in the pixel array PA may be of an RGB quad Bayer pattern, but is not limited thereto.

Figure 5:
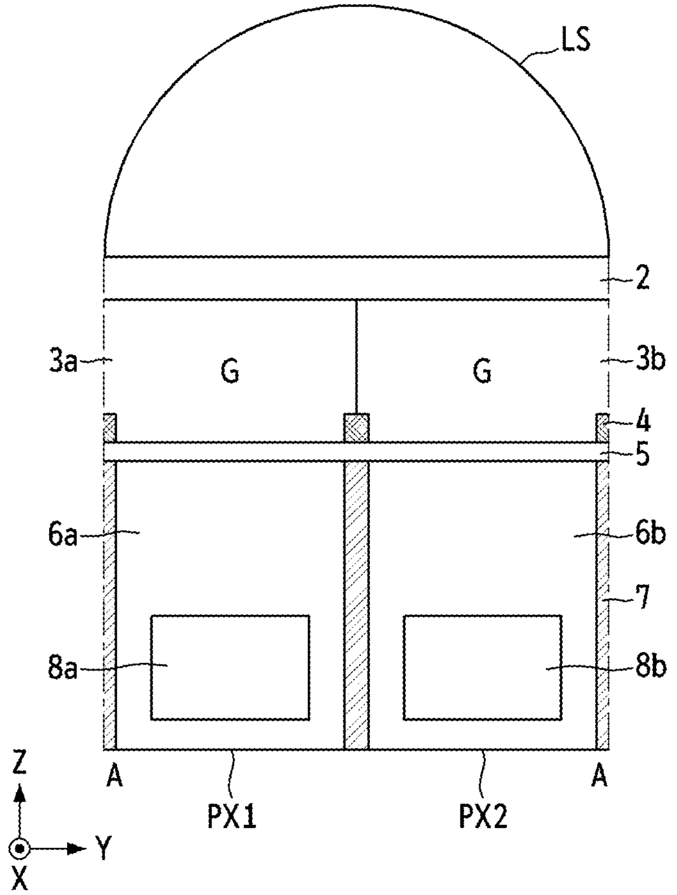
FIG. 5 is a cross-sectional view of a pixel array taken along line A-A of FIG. 4.

FIG. 5 is a cross-sectional view of a pixel array taken along line A-A of FIG. 4.

Referring to FIG. 5, the pixel array PA may include a unit pixel PX1 and a unit pixel PX2. The unit pixel PX1 and the unit pixel PX2 may be arranged to be adjacent to each other.

The pixel array PA may include substrates 6*a* and 6*b*, photoelectric transistors 8*a* and 8*b*, an anti-reflective film 7, a side anti-reflective film 4, color filters 3*a* and 3*b*, an upper planarization film 2, a lower planarization film 5 and a lens LS.

For example, P-type or N-type bulk substrates may be used as the substrates 6*a* and 6*b*, or P-type bulk substrates on which a P-type or N-type epitaxial layer is grown or N-type bulk substrates on which a P-type or N-type epitaxial layer is grown may be used as the substrates 6*a* and 6*b*. Also, in addition to the semiconductor substrates, substrates such as organic plastic substrates may be used as the substrates 6*a* and 6*b*.

The photoelectric transistors 8*a* and 8*b* may be photodiodes, phototransistors, photo gates, pinned photodiodes or any combination thereof.

The anti-reflective film 7 and the side anti-reflective film 4 may prevent external light incident on the lens LS from being permeated into an area G1 and an area G2. The anti-reflective film 7 and the side anti-reflective film 4 may include an insulating film such as a silicon oxide film, a silicon nitride film, a silicon oxynitride film, a resin, or any combination thereof and/or a stacked structure thereof, but the embodiments are not limited thereto.

The upper planarization film 2 and the lower planarization film 5 may be formed to be flat and have the color filters 3*a* and 3*b* interposed therebetween. The upper planarization film 2 and the lower planarization film 5 may include at least one of a silicon oxide-based material, a silicon nitride-based material, a resin or any combination thereof, but embodiments are not limited thereto.

Figure 6:
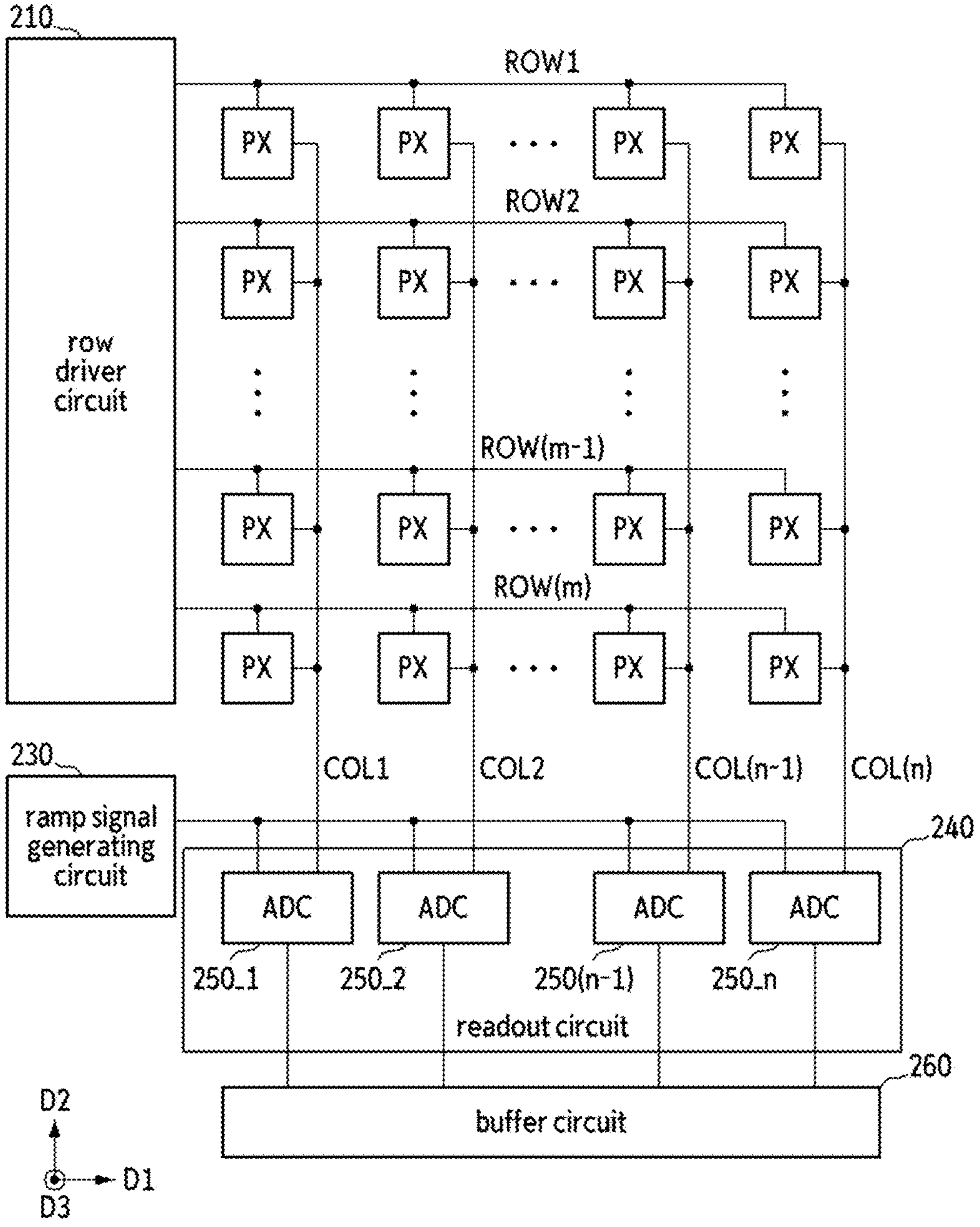
FIG. 6 is a view illustrating an image sensor according to some embodiments.
Figure 7:
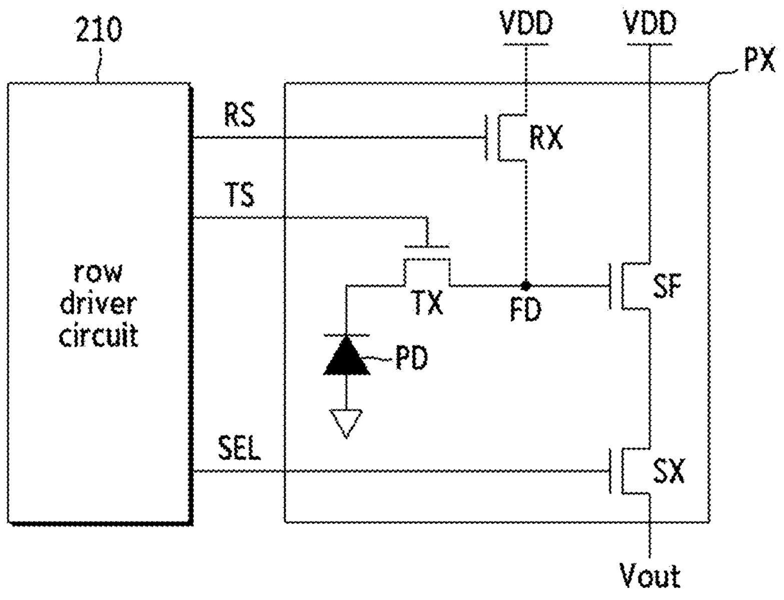
FIG. 7 is a view illustrating an example of a pixel of FIG. 6.

FIG. 6 is a view illustrating an image sensor according to some embodiments. FIG. 7 is a view illustrating an example of a pixel of FIG. 6.

Referring to FIGS. 6 and 7, the image sensor 200 may include a row driver circuit 210, row lines ROW1 to ROW(m), column lines COL1 to COL(n), a pixel array 270 (shown in FIG. 3), a ramp signal generating circuit 230, analog to digital converters 250_1, 250_2, . . . , 250_(n−1), 250*n*, and a buffer circuit 260.

The row driver circuit 210 may drive the pixel array 270 in a row unit. The row driver circuit 210 may generate a transfer control signal TS, a reset control signal RS, and a selection control signal SEL and provide the generated signals to the pixel PX of the pixel array 270, but the embodiment is not limited thereto.

In another embodiment, the row driver circuit 210 may allow signals from all pixels of the pixel array 270 to be output during a specific time period without selecting only a specific row of the pixel array 270.

The pixel array 270 may include a plurality of pixels PX. In this case, the pixels PX may be arranged in a grid shape along a plurality of rows and a plurality of columns. The pixel array 270 may detect light by using the plurality of pixels PX and convert the light into an electrical signal to generate an image signal.

The plurality of row lines ROW1 to ROW(m) may extend in a first direction D1. The plurality of row lines ROW1 to ROW(m) may be sequentially arranged in a second direction D2. For example, the first row line ROW1 may be disposed to be spaced apart from the second row line ROW2 in the second direction D2. The plurality of column lines COL1 to COL(n) may extend in the second direction D2. The plurality of column lines COL1 to COL(n) may be sequentially arranged in the first direction D1. For example, the second column line COL2 may be disposed to be spaced apart from the first column line COL1 in the first direction D1. However, the embodiment of the disclosure is not limited to the above example.

The plurality of pixels PX may be connected to the row lines ROW1 to ROW(m) and the column lines COL1 to COL(n). For example, one pixel PX may be connected to both the first row line ROW1 and the first column line COL1. Also, the pixel PX may be positioned at a portion where the first row line ROW1 and the first column line COL1 cross each other. Therefore, the plurality of pixels PX may be arranged in a form of a grid (e.g., the form of a matrix).

Referring to FIG. 7, the pixel PX may include a photodiode PD, a transfer transistor TX, a reset transistor RX, a source follower SF and a selection transistor SX. In this case, the pixel PX may be a unit of pixels included in the pixel array 270 or the pixel array area PA.

A first terminal of the transfer transistor TX may be electrically connected to the photodiode PD, and a second terminal thereof may be electrically connected to a floating diffusion region FD. A control electrode of the transfer transistor TX may receive the transfer control signal TS. In this case, light incident on the image sensor 200 may be converted into an electrical signal through the photodiode PD. The converted electrical signal may be transferred to the floating diffusion region FD through the transfer transistor TX.

A first terminal of the reset transistor RX may receive a power voltage VDD and a second terminal thereof may be electrically connected to the floating diffusion region FD. A control electrode of the reset transistor RX may receive the reset control signal RS. A first terminal of the source follower SF may receive the power voltage VDD, and a second terminal thereof may be electrically connected to a first terminal of the selection transistor SX. A control electrode of the source follower SF may be electrically connected to the floating diffusion region FD. A second terminal of the selection transistor SX may be electrically connected to the column lines COL1 to COL(n), and a control electrode thereof may receive the selection control signal SEL.

Each of the control signals TS, RS and SEL for respectively controlling the transistors TX, RX and SX may be output from the row driver circuit 210. An output signal Vout of the selection transistor SX may be supplied to the column lines COL1 to COL(n). The output signal Vout may correspond to the analog signal. That is, the output signal Vout output from the pixel PX may be converted into the digital signal through the readout circuit 240, and may be transferred to the image signal processor 100 as the image data IDATA.

In this case, the row lines ROW1 to ROW(m) of FIG. 6 may be signal lines for transferring the transfer control signal TS, the reset control signal RS and the selection control signal SEL from the row driver circuit 210 to the pixel PX. Also, the column lines COL1 to COL(n) of FIG. 6 may be signal lines for transferring the output signal Vout of the selection transistor SX.

Referring back to FIG. 6, the plurality of column lines COL1 to COL(n) may be connected to the analog-to-digital converters 250_1, 250_2, . . . , 250_(n−1), 250_*n*, respectively. In this case, the analog-to-digital converters 250_1, 250_2, . . . , 250_(n−1), 250_*n* may be also connected to the ramp signal generating circuit 230. That is, the analog-to-digital converters 250_1, 250_2, . . . , 250_(n−1), 250_*n* may receive the ramp signal from the ramp signal generating circuit 230, and may receive the output signal Vout from the plurality of column lines COL1 to COL(n). The analog-to-digital converters 250_1, 250_2, . . . , 250_(n−1), 250_*n* may perform a correlation double sampling (CDS) operation, a counting operation and the like to convert the output signal Vout, which is the analog signal, into the digital signal. In this case, the analog-to-digital converters 250_1, 250_2, . . . , 250_(n−1), 250_*n* may be included in the readout circuit 240 as shown in FIG. 3. The readout circuit 240 that includes the analog-to-digital converters 250_1, 250_2, . . . , 250_(n−1), 250_*n* may be disposed to be spaced apart from the pixel array 270 in a direction (e.g., (−) D2 direction) opposite to the second direction D2. Also, the plurality of analog-to-digital converters 250_1, 250_2, . . . , 250_(n−1), 250_*n* may be sequentially arranged along the first direction D1. That is, the analog-to-digital converters 250_1, 250_2, . . . , 250_(n−1), 250_*n* may be disposed to correspond to each pixel PX.

The buffer circuit 260 may be connected to the plurality of analog-to-digital converters 250_1, 250_2, . . . , 250_(n−1), 250_*n*, and may receive the digital signals converted from the analog-to-digital converters 250_1, 250_2, . . . , 250_(n−1), 250_*n*. The buffer circuit 260 may be disposed from the analog-to-digital converters 250_1, 250_2, . . . , 250_(n−1), 250_*n* in a direction opposite to the second direction D2.

Figure 8:
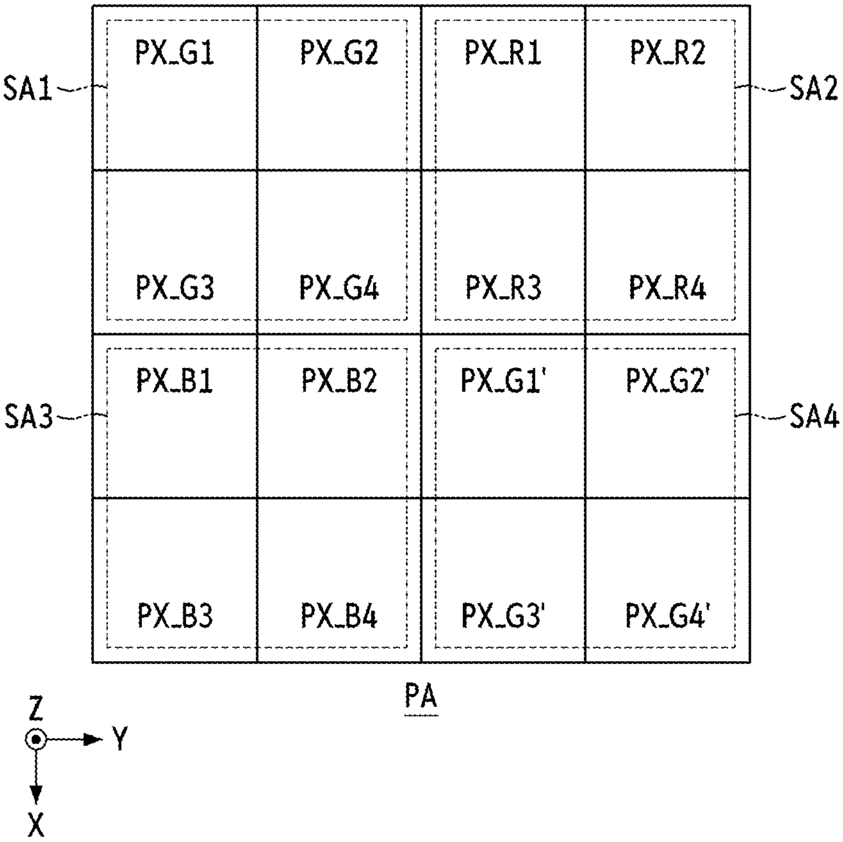
FIG. 8 is a view illustrating an example of the pixel array of FIG. 4.

FIG. 8 is a view illustrating an example of the pixel array of FIG. 4.

Referring to FIG. 8, the pixel array PA may include a first subpixel array SA1, a second subpixel array SA2, a third subpixel array SA3, and a fourth subpixel array SA4. The first subpixel array SA1 may include green pixels PX_G1, PX_G2, PX_G3 and PX_G4. The second subpixel array SA2 may include red pixels PX_R1, PX_R2, PX_R3 and PX_R4. The third subpixel array SA3 may include blue pixels PX_B1, PX_B2, PX_B3 and PX_B4. The fourth subpixel array SA4 may include green pixels PX_G1', PX_G2', PX_G3' and PX_G4'.

The green pixels PX_G1, PX_G2, PX_G3 and PX_G4 included in the first subpixel array SA1 may be covered by one lens LS (see FIG. 4), and may include a green color filter. The red pixels PX_R1, PX_R2, PX_R3 and PX_R4 included in the second subpixel array SA2 may be covered by one lens LS, and may include a red color filter. The blue pixels PX_B1, PX_B2, PX_B3 and PX_B4 included in the third subpixel array SA3 may be covered by one lens LS, and may include a blue color filter. The green pixels PX_G1, PX_G2, PX_G3 and PX_G4 included in the fourth subpixel array SA4 may be covered by one lens LS, and may include a green color filter.

The green pixels PX_G1, PX_G2, PX_G3 and PX_G4 included in the first subpixel array SA1 may share one column line, and may share one analog-to-digital converter. The red pixels PX_R1, PX_R2, PX_R3 and PX_R4 included in the second subpixel array SA2 may share one column line, and may share one analog-to-digital converter. The blue pixels PX_B1, PX_B2, PX_B3 and PX_B4 included in the third subpixel array SA3 may share one column line, and may share one analog-to-digital converter. The green pixels PX_G1', PX_G2', PX_G3' and PX_G4' included in the fourth subpixel array SA4 may share one column line, and may share one analog-to-digital converter.

For example, referring to FIG. 6, a plurality of pixels included in the same subpixel array may be connected to one (e.g., COL1) of the column lines COL1 to COL(n), and thus the plurality of pixels may share the analog-to-digital converter 250_1 connected to the column line COL1.

Since the plurality of pixels included in the same subpixel array share one analog-to-digital converter, the image sensor may operate in a rolling shutter mode during a readout operation for the plurality of pixels included in the same subpixel array.

For example, start time points of an integration time of the green pixels PX_G1, PX_G2, PX_G3 and PX_G4 included in the first subpixel array SA1 may be different from one another. Also, start time points in an integration time of the red pixels PX_R1, PX_R2, PX_R3 and PX_R4 included in the second subpixel array SA2 may be different from one another. Also, start time points in an integration time of the blue pixels PX_B1, PX_B2, PX_B3 and PX_B4 included in the third subpixel array SA3 may be different from one another. Also, start time points in an integration time of the green pixels PX_G1', PX_G2', PX_G3' and PX_G4' included in the fourth subpixel array SA4 may be different from one another.

Since signals from the green pixels PX_G1, PX_G2, PX_G3 and PX_G4 included in the first subpixel array SA1, the red pixels PX_R1, PX_R2, PX_R3 and PX_R4 included in the second subpixel array SA2, the blue pixels PX_B1, PX_B2, PX_B3 and PX_B4, and the green pixels PX_G1', PX_G2', PX_G3' and PX_G4' included in the fourth subpixel array SA4 are read out by different analog-to-digital converters, the image sensor 200 (shown in FIG. 1) may operate in a global shutter mode during a readout operation for the plurality of pixels included in different subpixel arrays. When the image sensor operates in a global shutter mode, start time points in the integration time of the plurality of pixels may be the same as each other. Operations in the rolling shutter mode and the global shutter mode of the image sensor will be described later with reference to FIG. 12.

Figure 9:
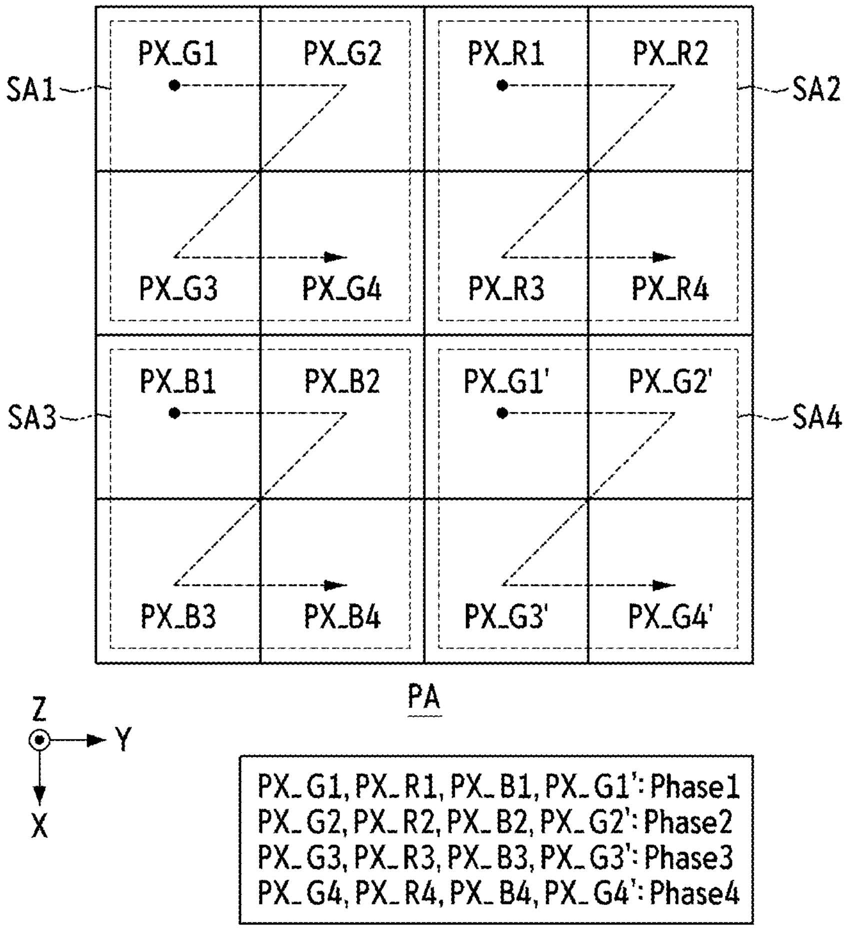
FIGS. 9 to 11 are views illustrating a sequence of a readout operation of an image sensor according to some embodiments.
Figure 10:
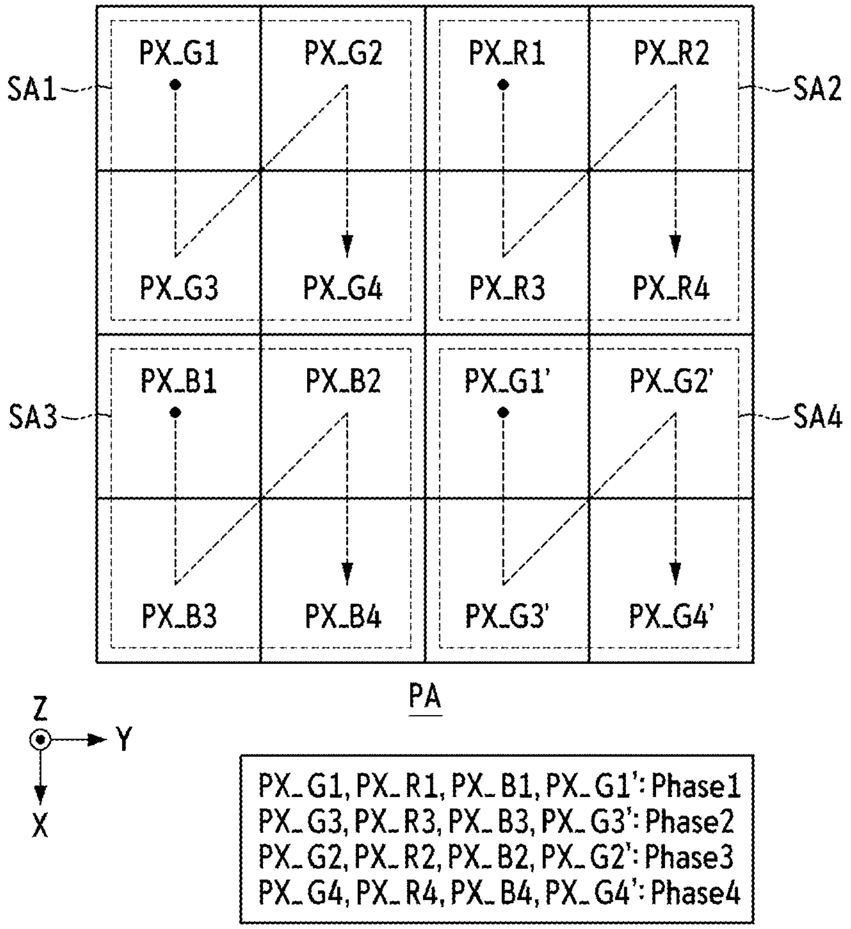
Figure 11:
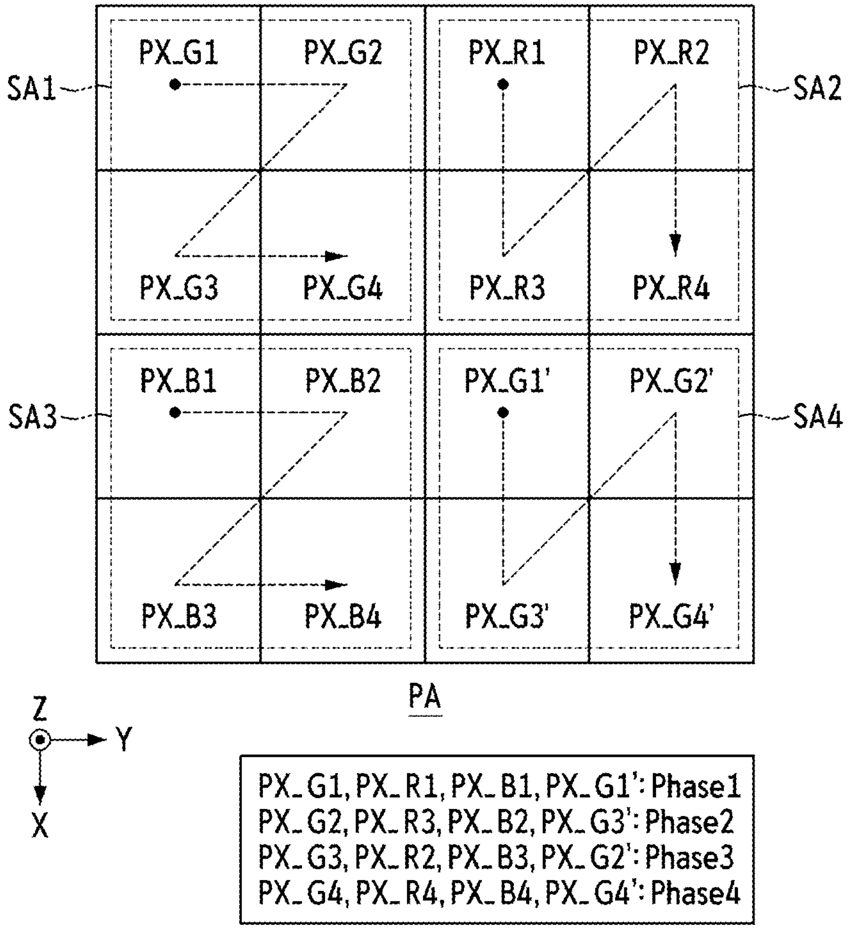

FIGS. 9 to 11 are views illustrating a sequence of a readout operation of an image sensor according to some embodiments.

In the following description, it is assumed that the first direction X is a downward direction, a direction opposite to the first direction X is an upward direction, the second direction Y is a right direction and the direction opposite to the second direction Y is a left direction.

First, referring to FIG. 9, the readout circuit 240 may simultaneously perform a readout operation for the first to fourth subpixel arrays SA1 to SA4. In this case, a sequence of the readout operation may be set in advance for the plurality of pixels included in the same subpixel array. For example, as shown in FIG. 9, the readout circuit 240 may perform the readout operation for the plurality of pixels included in the same subpixel array in an order of a pixel disposed on an upper left portion, a pixel disposed on an upper right portion, a pixel disposed on a lower left portion, and a pixel disposed on a lower right portion.

For example, the readout operation may be performed for the first subpixel array SA1 in an order of the green pixel PX_G1, the green pixel PX_G2, the green pixel PX_G3, and the green pixel PX_G4. Also, the readout operation may be performed for the second subpixel array SA2 in an order of the red pixel PX_R1, the red pixel PX_R2, the red pixel PX_R3, and the red pixel PX_R4. Also, the readout operation may be performed for the third subpixel array SA3 in an order of the blue pixel PX_B1, the blue pixel PX_B2, the blue pixel PX_B3, and the blue pixel PX_B4. Also, the readout operation may be performed for the fourth subpixel array SA4 in an order of the green pixel PX_G1', the green pixel PX_G2', the green pixel PX_G3', and the green pixel PX_G4'.

A phase of each of the plurality of pixels included in each subpixel array may be determined in accordance with a readout order of the readout circuit 240 with respect to each of the plurality of pixels. For example, a pixel that is read out for a first time among the plurality of pixels included in each subpixel array may have a first phase Phase1. Also, a pixel that is read out for a second time among the plurality of pixels included in each subpixel array may have a second phase Phase2. Also, a pixel that is read out for a third time among the plurality of pixels included in each subpixel array may have a third phase Phase3. Also, a pixel that is read out for a fourth time among the plurality of pixels included in each subpixel array may have a fourth phase Phase4.

For example, the green pixel PX_G1 of the first subpixel array SA1, the red pixel PX_R1 of the second subpixel array SA2, the blue pixel PX_B1 of the third subpixel array SA3 and the green pixel PX_G1' of the fourth subpixel array SA4 may have the first phase Phase1.

Also, the green pixel PX_G2 of the first subpixel array SA1, the red pixel PX_R2 of the second subpixel array SA2, the blue pixel PX_B2 of the third subpixel array SA3 and the green pixel PX_G2' of the fourth subpixel array SA4 may have the second phase Phase2.

Also, the green pixel PX_G3 of the first subpixel array SA1, the red pixel PX_R3 of the second subpixel array SA2, the blue pixel PX_B3 of the third subpixel array SA3 and the green pixel PX_G3' of the fourth subpixel array SA4 may have the third phase Phase3.

Also, the green pixel PX_G4 of the first subpixel array SA1, the red pixel PX_R4 of the second subpixel array SA2, the blue pixel PX_B4 of the third subpixel array SA3 and the green pixel PX_G4' of the fourth subpixel array SA4 may have the fourth phase Phase4.

As described above, pixels included in the same subpixel array and sequentially read out may be defined as pixels having different phases from each other. That is, a plurality of pixels connected to the same column line and share the analog-to-digital converter, based on which the image sensor operates in a rolling shutter mode during the readout operation, may be pixels having different phases. Pixels included in the same subpixel array and having different phases may have different start time points of the integration time.

On the other hand, pixels included in different subpixel arrays and read out in the same order in each subpixel array may be defined as pixels having the same phase. That is, a plurality of pixels connected to different column lines and do not share the analog-to-digital converter, based on which the image sensor operates in a global shutter mode during the readout operation may be pixels having the same phase. Pixels included in different subpixel arrays and having the same phase may have the same start time point of the integration time.

Next, unlike FIG. 9, referring to FIG. 10, the readout circuit 240 may perform the readout operation for the plurality of pixels included in the same subpixel array in an order of a pixel disposed on an upper left portion, a pixel disposed on a lower left portion, a pixel disposed on an upper right portion, and a pixel disposed on a lower right portion.

For example, the readout operation may be performed for the first subpixel array SA1 in an order of the green pixel PX_G1, the green pixel PX_G3, the green pixel PX_G2, and the green pixel PX_G4. Also, the readout operation may be performed for the second subpixel array SA2 in an order of the red pixel PX_R1, the red pixel PX_R3, the red pixel PX_R2, and the red pixel PX_R4. Also, the readout operation may be performed for the third subpixel array SA3 in an order of the blue pixel PX_B1, the blue pixel PX_B3, the blue pixel PX_B2, and the blue pixel PX_B4. Also, the readout operation may be performed for the fourth subpixel array SA4 in an order of the green pixel PX_G1', the green pixel PX_G3', the green pixel PX_G2', and the green pixel PX_G4'.

In this case, a pixel that is read out for the first time among the plurality of pixels included in each subpixel array may have a first phase Phase1. Also, a pixel that is read out for the second time among the plurality of pixels included in each subpixel array may have a second phase Phase2. Also, a pixel that is read out for the third time among the plurality of pixels included in each subpixel array may have a third phase Phase3. Also, a pixel that is read out for the fourth time among the plurality of pixels included in each subpixel array may have a fourth phase Phase4.

For example, the green pixel PX_G1 of the first subpixel array SA1, the red pixel PX_R1 of the second subpixel array SA2, the blue pixel PX_B1 of the third subpixel array SA3, and the green pixel PX_G1' of the fourth subpixel array SA4 may have the first phase Phase1. Also, the green pixel PX_G3 of the first subpixel array SA1, the red pixel PX_R3 of the second subpixel array SA2, the blue pixel PX_B3 of the third subpixel array SA3, and the green pixel PX_G3' of the fourth subpixel array SA4 may have the second phase Phase2. Also, the green pixel PX_G2 of the first subpixel array SA1, the red pixel PX_R2 of the second subpixel array SA2, the blue pixel PX_B2 of the third subpixel array SA3, and the green pixel PX_G2' of the fourth subpixel array SA4 may have the third phase Phase3. Also, the green pixel PX_G4 of the first subpixel array SA1, the red pixel PX_R4 of the second subpixel array SA2, the blue pixel PX_B4 of the third subpixel array SA3, and the green pixel PX_G4' of the fourth subpixel array SA4 may have the fourth phase Phase4.

As described above, various modifications may be made in the readout order of the readout circuit 240 for the plurality of pixels included in the same subpixel array depending on the embodiments, and thus types of pixels included in the first to fourth phases Phase1 to Phase4 may be different from one another.

Next, unlike FIGS. 9 and 10, referring to FIG. 11, the readout circuit 240 may perform the readout operation for the plurality of pixels included in some subpixel arrays in an order of a pixel disposed on an upper left portion, a pixel disposed on an upper right portion, a pixel disposed on a lower left portion, and a pixel disposed on a lower right portion. Also, the readout circuit 240 may perform the readout operation for the plurality of pixels included in some other subpixel arrays in an order of a pixel disposed on an upper left portion, a pixel disposed on a lower left portion, a pixel disposed on an upper right portion, and a pixel disposed on a lower right portion.

For example, the readout operation may be performed for the first subpixel array SA1 in an order of the green pixel PX_G1, the green pixel PX_G2, the green pixel PX_G3, and the green pixel PX_G4. Also, the readout operation may be performed for the second subpixel array SA2 in an order of the red pixel PX_R1, the red pixel PX_R3, the red pixel PX_R2, and the red pixel PX_R4. Also, the readout operation may be performed for the third subpixel array SA3 in an order of the blue pixel PX_B1, the blue pixel PX_B2, the blue pixel PX_B3, and the blue pixel PX_B4. Also, the readout operation may be performed for the fourth subpixel array SA4 in an order of the green pixel PX_G1', the green pixel PX_G3', the green pixel PX_G2' and the green pixel PX_G4'.

In this case, a pixel that is read out for the first time among the plurality of pixels included in each subpixel array may have the first phase Phase1. Also, a pixel that is read out for the second time among the plurality of pixels included in each subpixel array may have the second phase Phase2. Also, a pixel that is read out for the third time among the plurality of pixels included in each subpixel array may have the third phase Phase3. Also, a pixel that is read out for the fourth time among the plurality of pixels included in each subpixel array may have the fourth phase Phase4.

For example, the green pixel PX_G1 of the first subpixel array SA1, the red pixel PX_R1 of the second subpixel array SA2, the blue pixel PX_B1 of the third subpixel array SA3 and the green pixel PX_G1' of the fourth subpixel array SA4 may have the first phase Phase1.

Also, the green pixel PX_G2 of the first subpixel array SA1, the red pixel PX_R3 of the second subpixel array SA2, the blue pixel PX_B2 of the third subpixel array SA3 and the green pixel PX_G3' of the fourth subpixel array SA4 may have the second phase Phase2.

Also, the green pixel PX_G3 of the first subpixel array SA1, the red pixel PX_R2 of the second subpixel array SA2, the blue pixel PX_B3 of the third subpixel array SA3, and the green pixel PX_G2' of the fourth subpixel array SA4 may have the third phase Phase3. Also, the green pixel PX_G4 of the first subpixel array SA1, the red pixel PX_R4 of the second subpixel array SA2, the blue pixel PX_B4 of the third subpixel array SA3, and the green pixel PX_G4' of the fourth subpixel array SA4 may have the fourth phase Phase4.

As described above, various modifications may be made in the readout order of the readout circuit 240 for the plurality of pixels included in the same subpixel array depending on the embodiments, and thus types of pixels included in the first to fourth phases Phase1 to Phase4 may be different from one another.

In addition, each readout order of pixels included in the plurality of subpixel arrays SA1 to SA4 included in the pixel array PA may be different for each subpixel array.

Figure 12:
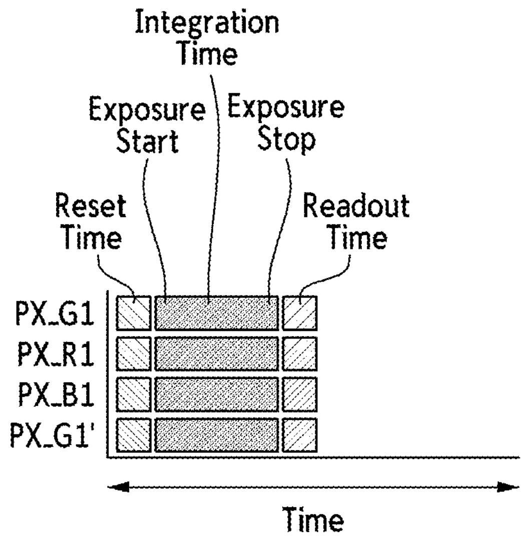
FIG. 12 is a view conceptually illustrating an example in which an image sensor according to some embodiments operates in a global shutter mode for pixels having a first phase.

FIG. 12 is a view conceptually illustrating an example in which an image sensor according to some embodiments operates in a global shutter mode for pixels having a first phase.

Hereinafter, as described with reference to FIG. 9, the readout circuit 240 of the image sensor 200 may perform a readout operation for the plurality of pixels included in the same subpixel array in the order of a pixel disposed on an upper left portion, a pixel disposed on an upper right portion, a pixel disposed on a lower left portion, and a pixel disposed on a lower right portion.

Referring to FIG. 12, the image sensor 200 may drive pixels PX_G1, PX_R1, PX_B1, and PX_G1' having the first phase in the global shutter mode. In the global shutter mode, the image sensor 200 may sequentially perform a reset operation for resetting charges accumulated in a floating diffusion node, an accumulation operation for accumulating photocharges generated in a photoelectric conversion element, and a readout operation with respect to the pixels PX_G1, PX_R1, PX_B1 and PX_G1' having the first phase.

The integration time may mean a time for substantially accumulating photocharges generated in the photoelectric conversion element, for example, a photodiode, which is included in each of the plurality of pixels PX. The integration time may be also referred to as a charge accumulation time. The integration time may mean a time period from a time point when the image sensor 200 opens a shutter, that is, a time point when the photocharges start to be exposed to light, to a time point when the image sensor 200 closes the shutter, that is, a time point when the photocharges stop being exposed to light.

The readout time may mean a time that a pixel signal corresponding to photocharges generated in each of the pixels PX_G1, PX_R1, PX_B1 and PX_G1' having the first phase is output from each of the pixels PX_G1, PX_R1, PX_B1 and PX_G1' having the first phase.

The image sensor 200 may control a reset time during which the reset operation is performed and an integration time during which the accumulation operation is performed, to be the same for the pixels PX_G1, PX_R1, PX_B1 and PX_G1' having the first phase. Therefore, the start time point of the integration time may be the same for the pixels PX_G1, PX_R1, PX_B1 and PX_G1' having the first phase Phase1.

In this way, the image sensor 200 may operate in the global shutter mode for each of the pixels PX_G1, PX_R1, PX_B1 and PX_G1' having the first phase such that all signals photoelectrically converted by all photoelectric conversion elements in one frame image may be transferred to the floating diffusion node(s) at once and then a signal of a corresponding pixel may be output from a corresponding row.

Figure 13:
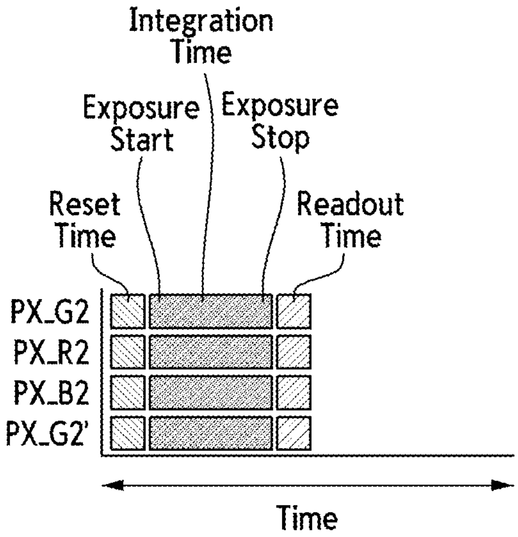
FIG. 13 is a view conceptually illustrating an example in which an image sensor according to some embodiments operates in a global shutter mode for pixels having a second phase.

FIG. 13 is a view conceptually illustrating an example in which an image sensor according to some embodiments operates in a global shutter mode for pixels having a second phase.

Hereinafter, a redundant description from the previous embodiments will be omitted, and the following description will be focus on differences from the previous embodiments.

Referring to FIG. 13, the image sensor 200 may drive pixels PX_G2, PX_R2, PX_B2 and PX_G2' having the second phase in the global shutter mode. The image sensor 200 may control a reset time during which the reset operation is performed and an integration time during which the accumulation operation is performed, to be the same for the pixels PX_G2, PX_R2, PX_B2 and PX_G2' having the second phase. Therefore, the start time point of the integration time may be the same for the pixels PX_G2, PX_R2, PX_B2 and PX_G2' having the second phase Phase2.

Figure 14:
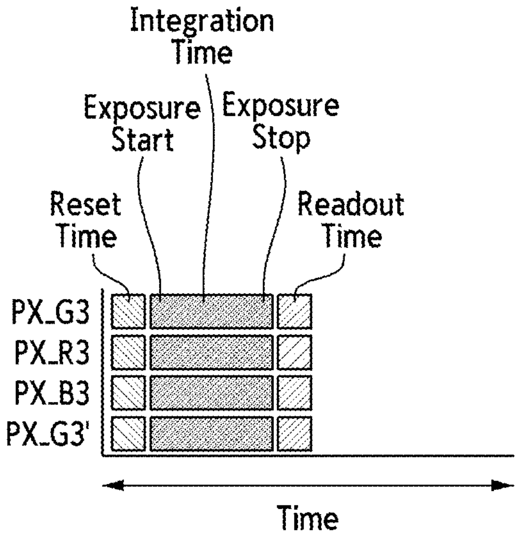
FIG. 14 is a view conceptually illustrating an example in which an image sensor according to some embodiments operates in a global shutter mode for pixels having a third phase.

FIG. 14 is a view conceptually illustrating an example in which an image sensor according to some embodiments operates in a global shutter mode for pixels having a third phase.

Referring to FIG. 14, the image sensor 200 may drive pixels PX_G3, PX_R3, PX_B3 and PX_G3' having the third phase in the global shutter mode. The image sensor 200 may control a reset time during which the reset operation is performed and an integration time during which the accumulation operation is performed, to be the same for the pixels PX_G3, PX_R3, PX_B3 and PX_G3' having the third phase. Therefore, the start time point of the integration time may be the same for the pixels PX_G3, PX_R3, PX_B3 and PX_G3' having the third phase Phase3.

Figure 15:
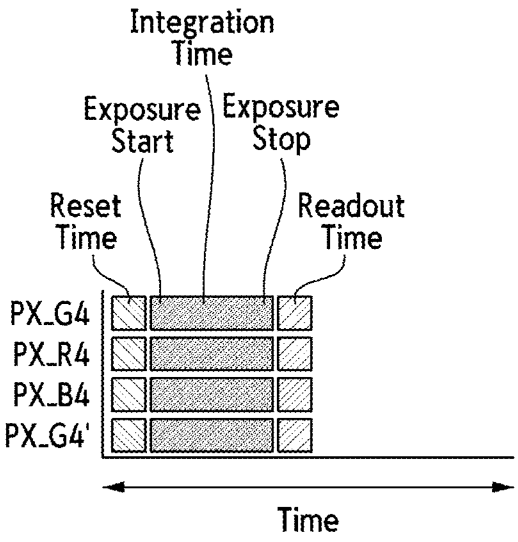
FIG. 15 is a view conceptually illustrating an example in which an image sensor according to some embodiments operates in a global shutter mode for pixels having a fourth phase.

FIG. 15 is a view conceptually illustrating an example in which an image sensor according to some embodiments operates in a global shutter mode for pixels having a fourth phase.

Referring to FIG. 15, the image sensor 200 may drive pixels PX_G4, PX_R4, PX_B4 and PX_G4' having the fourth phase in the global shutter mode. The image sensor 200 may control a reset time during which the reset operation is performed and an integration time during which the accumulation operation is performed, to be the same for the pixels PX_G4, PX_R4, PX_B4 and PX_G4' having the fourth phase. Therefore, the start time point of the integration time may be the same for the pixels PX_G4, PX_R4, PX_B4 and PX_G4' having the fourth phase Phase4.

Figure 16:
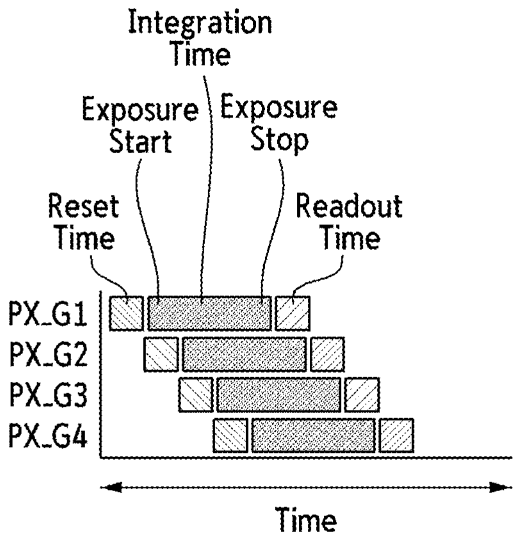
FIG. 16 is a view conceptually illustrating an example in which an image sensor according to some embodiments operates in a rolling shutter mode for pixels included in a first subpixel array.

FIG. 16 is a view conceptually illustrating an example in which an image sensor according to some embodiments operates in a rolling shutter mode for pixels included in a first subpixel array.

Referring to FIG. 16, the image sensor 200 may drive the pixels PX_G1, PX_G2, PX_G3 and PX_G4 included in the first subpixel array SA1 in the rolling shutter mode. In the rolling shutter mode, the image sensor 200 may sequentially perform, in an order, a reset operation for resetting charges accumulated in the floating diffusion node, an accumulation operation for accumulating photocharges generated in the photoelectric conversion element, and a readout operation. However, unlike the global shutter mode described with reference to FIGS. 12 to 15, the reset operation, the accumulation operation, and the readout operation for each of the pixels PX_G1, PX_G2, PX_G3 and PX_G4 included in the first subpixel array SA1 may have an operation time difference for each of the pixels PX_G1, PX_G2, PX_G3 and PX_G4.

For example, the image sensor 200 may sequentially perform the reset operation, the accumulation operation, and the readout operation in accordance with the readout order (e.g., the order of the green pixel PX_G1, the green pixel PX_G2, the green pixel PX_G3 and the green pixel PX_G4) for the plurality of pixels PX_G1, PX_G2, PX_G3 and PX_G4 included in the first subpixel array SA1. Therefore, the start time point of the reset time, the start time point of the integration time, and the start time point of the readout time of each of the plurality of pixels PX_G1, PX_G2, PX_G3 and PX_G4 included in the first subpixel array SA1 may be different among the pixels PX_G1, PX_G2, PX_G3 and PX_G4.

Figure 17:
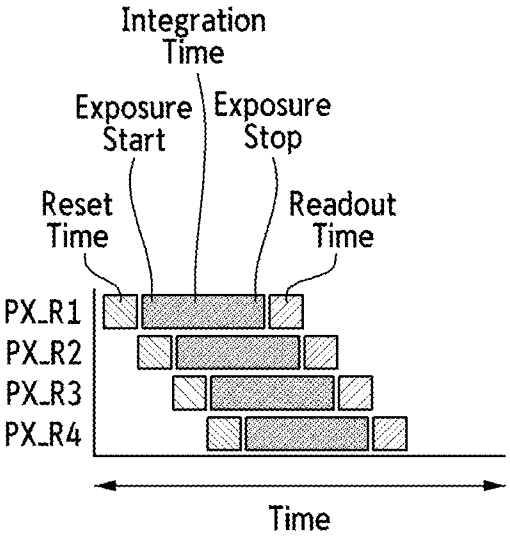
FIG. 17 is a view conceptually illustrating an example in which an image sensor according to some embodiments operates in a rolling shutter mode for pixels included in a second subpixel array.

FIG. 17 is a view conceptually illustrating an example in which an image sensor according to some embodiments operates in a rolling shutter mode for pixels included in a second subpixel array.

Referring to FIG. 17, the image sensor 200 may drive the pixels PX_R1, PX_R2, PX_R3 and PX_R4 included in the second subpixel array SA2 in the rolling shutter mode. In the rolling shutter mode, the image sensor 200 may sequentially perform, in an order, a reset operation for resetting charges accumulated in the floating diffusion node, an accumulation operation for accumulating photocharges generated in the photoelectric conversion element, and a readout operation. However, unlike the global shutter mode, the reset operation, the accumulation operation, and the readout operation for each of the pixels PX_R1, PX_R2, PX_R3 and PX_R4 included in the second subpixel array SA2 may have an operation time difference for each of the pixels PX_R1, PX_R2, PX_R3 and PX_R4.

For example, the image sensor 200 may sequentially perform the reset operation, the accumulation operation, and the readout operation in accordance with the readout order (e.g., the order of the red pixel PX_R1, the red pixel PX_R2, the red pixel PX_R3 and the red pixel PX_R4) for the plurality of pixels PX_R1, PX_R2, PX_R3 and PX_R4 included in the second subpixel array SA2. Therefore, the start time point of the reset time, the start time point of the integration time, and the start time point of the readout time of each of the plurality of pixels PX_R1, PX_R2, PX_R3 and PX_R4 included in the second subpixel array SA2 may be different among the pixels PX_R1, PX_R2, PX_R3 and PX_R4.

Figure 18:
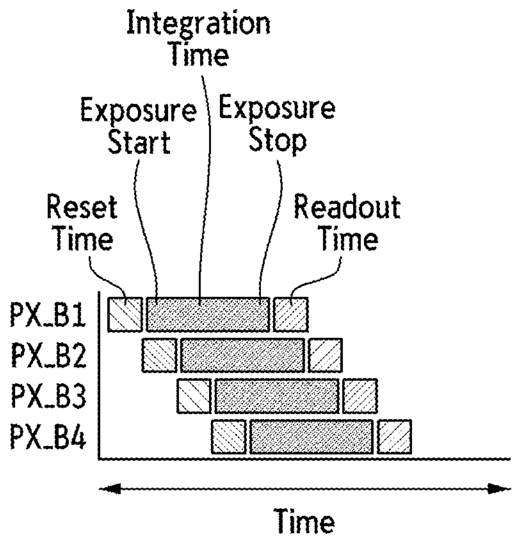
FIG. 18 is a view conceptually illustrating an example in which an image sensor according to some embodiments operates in a rolling shutter mode for pixels included in a third subpixel array.

FIG. 18 is a view conceptually illustrating an example in which an image sensor according to some embodiments operates in a rolling shutter mode for pixels included in a third subpixel array.

Referring to FIG. 18, the image sensor 200 may drive the pixels PX_B1, PX_B2, PX_B3 and PX_B4 included in the third subpixel array SA3 in the rolling shutter mode. In the rolling shutter mode, the image sensor 200 may sequentially perform, in an order, a reset operation for resetting charges accumulated in the floating diffusion node, an accumulation operation for accumulating photocharges generated in the photoelectric conversion element, and a readout operation. However, unlike the global shutter mode, the reset operation, the accumulation operation, and the readout operation for each of the pixels PX_B1, PX_B2, PX_B3 and PX_B4 included in the third subpixel array SA3 may have an operation time difference for each of the pixels PX_B1, PX_B2, PX_B3 and PX_B4.

For example, the image sensor 200 may sequentially perform the reset operation, the accumulation operation, and the readout operation in accordance with the readout order (e.g., the order of the blue pixel PX_B1, the blue pixel PX_B2, the blue pixel PX_B3 and the blue pixel PX_B4) for the plurality of pixels PX_B1, PX_B2, PX_B3 and PX_B4 included in the third subpixel array SA3. Therefore, the start time point of the reset time, the start time point of the integration time, and the start time point of the readout time of each of the plurality of pixels PX_B1, PX_B2, PX_B3 and PX_B4 included in the third subpixel array SA3 may be different among the pixels PX_B1, PX_B2, PX_B3 and PX_B4.

Figure 19:
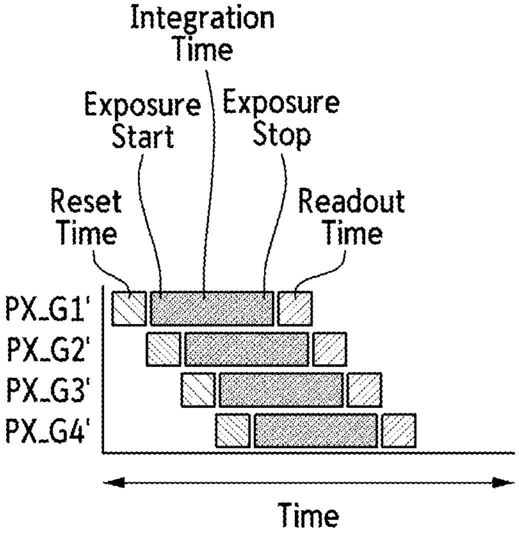
FIG. 19 is a view conceptually illustrating an example in which an image sensor according to some embodiments operates in a rolling shutter mode for pixels included in a fourth subpixel array.

FIG. 19 is a view conceptually illustrating an example in which an image sensor according to some embodiments operates in a rolling shutter mode for pixels included in a fourth subpixel array.

Referring to FIG. 19, the image sensor 200 may drive the pixels PX_G1', PX_G2', PX_G3' and PX_G4' included in the fourth subpixel array SA4 in the rolling shutter mode. In the rolling shutter mode, the image sensor 200 may sequentially perform, in an order, a reset operation for resetting charges accumulated in the floating diffusion node, an accumulation operation for accumulating photocharges generated in the photoelectric conversion element, and a readout operation. However, unlike the global shutter mode, the reset operation, the accumulation operation, and the readout operation for each of the pixels PX_G1', PX_G2', PX_G3' and PX_G4' included in the fourth subpixel array SA4 may have an operation time difference for each of the pixels PX_G1', PX_G2', PX_G3' and PX_G4'.

For example, the image sensor 200 may sequentially perform the reset operation, the accumulation operation, and the readout operation in accordance with the readout order (e.g., the order of the green pixel PX_G1', the green pixel PX_G2', the green pixel PX_G3' and the green pixel PX_G4') for the plurality of pixels PX_G1', PX_G2', PX_G3' and PX G4' included in the fourth subpixel array SA4. Therefore, the start time point of the reset time, the start time point of the integration time, and the start time point of the readout time of each of the plurality of pixels PX_G1', PX_G2', PX_G3' and PX_G4' included in the fourth subpixel array SA4 may be different among the pixels PX_G1', PX_G2', PX_G3' and PX G4'.

Figure 20:
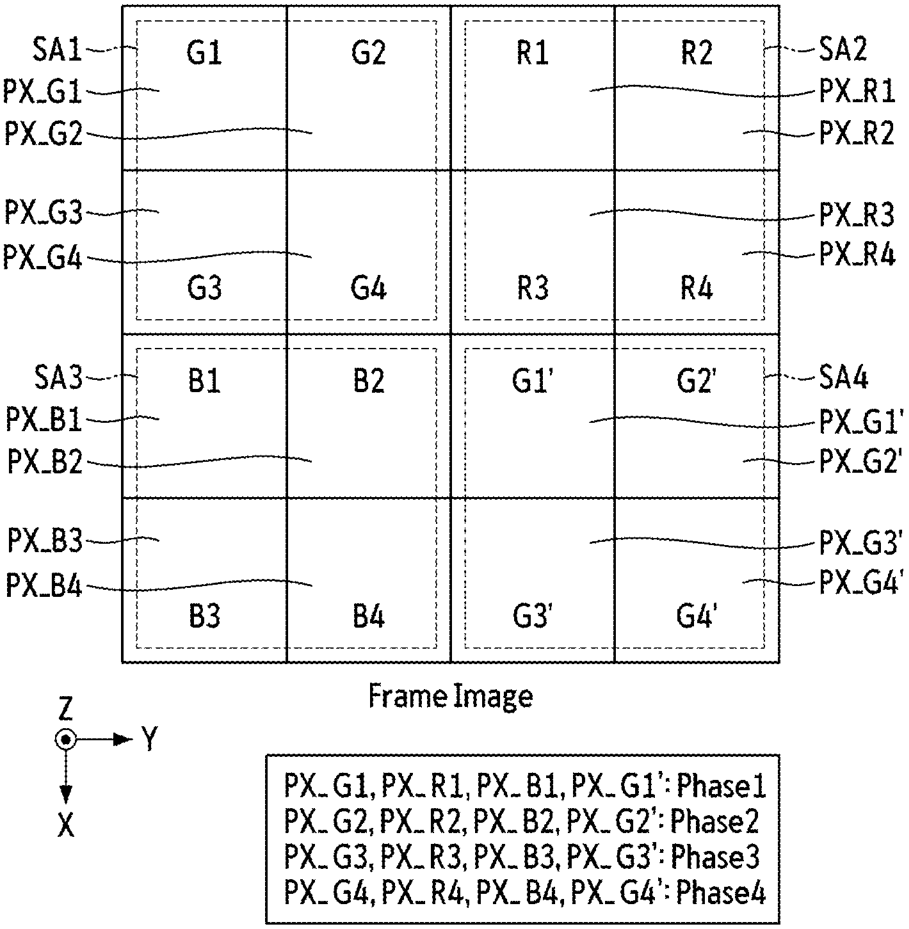
FIG. 20 is a conceptual view illustrating a frame image signal according to some embodiments.

FIG. 20 is a conceptual view illustrating a frame image signal according to some embodiments.

Referring to FIG. 20, a frame image signal (denoted as 'Frame Image') may be a signal that is output by the image sensor 200 by sensing light from the pixel array PA of FIG. 4. For example, light may reach photoelectric transistors 8*a* and 8*b* (shown in FIG. 5) by passing through color filters 3*a* and 3*b* (shown in FIG. 5) of the pixel array PA, and the frame image signal Frame Image may be output from the logic circuit area LC (shown in FIG. 2). That is, the frame image signal Frame Image may be included in the image data IDATA shown in FIG. 1.

For example, the frame image signal Frame Image may include a first green pixel value G1 output by sensing light that has passed through the color filter 3*a* having a green color. Also, the frame image signal Frame Image may include a second green pixel value G2 output by sensing light that has passed through the color filter 3*b* having a green color. That is, green pixel values G1 to G4, blue pixel values B1 to B4, red pixel values R1 to R4 and green pixel values G1' to G4', which are shown in FIG. 20 may be image data IDATA output by the image sensor 200 by sensing light that has passed through a color filter having a corresponding color.

The frame image signal Frame Image may be arranged in such a manner that the pixel values are as shown in FIG. 20 to correspond to the color of the color filter of the pixel array PA. However, FIG. 20 merely shows that each pixel value is arranged in accordance with a position of each unit pixel PX and a storage position of the pixel value of the actually output frame image signal Frame Image is not limited to the shown position.

Figure 21:
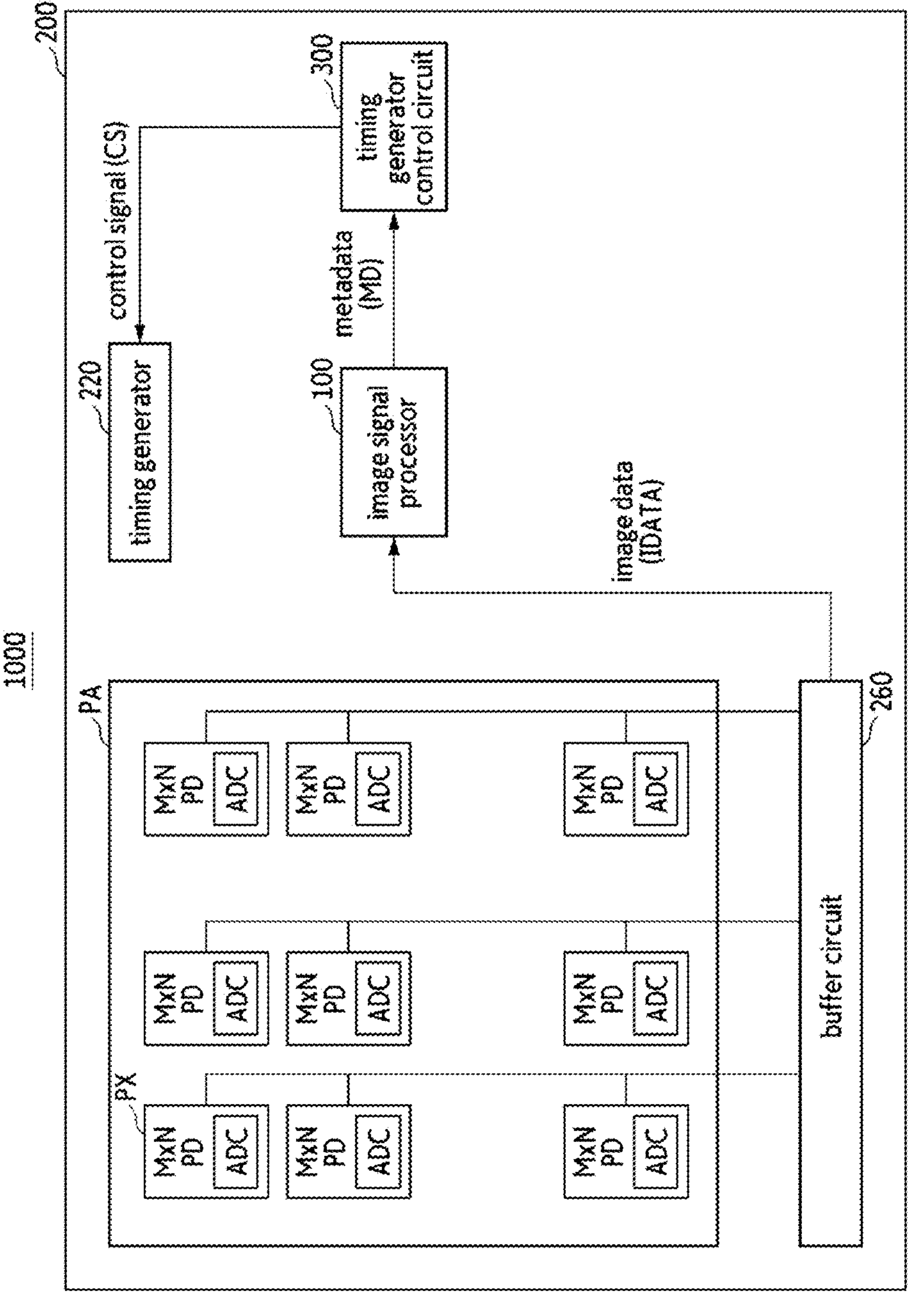
FIG. 21 is a view illustrating an image sensing system according to some embodiments.

FIG. 21 is a view illustrating an image sensing system according to some embodiments.

Referring to FIG. 21, an image sensing system 1000 may include an image sensor 200, and the image sensor 200 may include a timing generator 220, a plurality of pixels PX, analog-to-digital converters ADC, a buffer circuit 260, an image signal processor 100 and a timing generator control circuit 300.

The plurality of pixels PX (e.g., M×N pixels) may be grouped into one group based on whether the plurality of pixels PX share the analog-to-digital converter ADC. As shown in FIG. 21, the plurality of pixels PX that are grouped into one group may share one analog-to-digital converter ADC. The plurality of pixels PX included in one group may correspond to the plurality of pixels included in one subpixel array described with reference to FIGS. 1 to 20. The image data IDATA read out through the readout circuit 240 may be buffered in the buffer circuit 260, and then may be provided to the image signal processor 100.

The image signal processor 100 may calculate a motion vector of the object sensed by the image sensor 200 by processing the image data IDATA. The image signal processor 100 may generate metadata MD related to the motion vector of the object based on the calculated motion vector, and may provide the generated metadata to the timing generator control circuit 300.

The timing generator control circuit 300 may output a control signal CS for controlling the timing generator 220 based on the metadata MD and provide the control signal CS to the timing generator 220. The timing generator 220 may output a signal for controlling an operation timing of the components (e.g., the row driver circuit 210 (shown in FIG. 3)) included in the image sensor 200 based on the control signal CS and provide the output signal to the components.

The image sensor 200 is shown in FIG. 21 as including both the image signal processor 100 and the timing generator control circuit 300, but the embodiment is not limited thereto. For example, at least one of the image signal processor 100 or the timing generator control circuit 300 may be separate from the image sensor 200.

Figure 22:
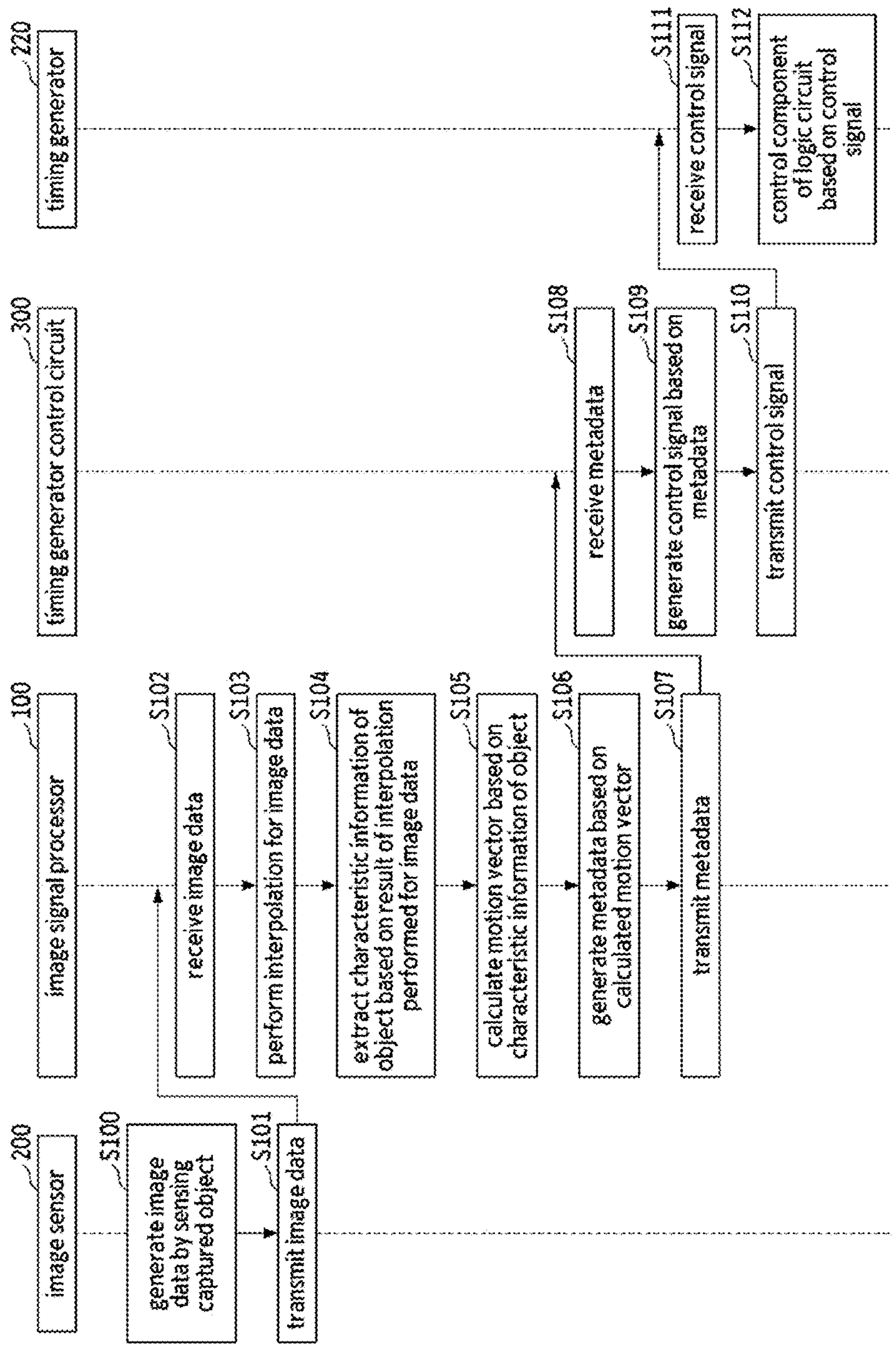
FIG. 22 is a flow chart illustrating an operating method of an image sensing system according to some embodiments.

FIG. 22 is a flow chart illustrating an operating method of an image sensing system according to some embodiments.

Referring to FIGS. 21 and 22, the image sensor 200 may generate image data by sensing a captured object (S100), and may transmit the generated image data IDATA (S101). The image signal processor 100 may receive the image data IDATA (S102), and may perform interpolation for the image data IDATA (S103). Afterwards, the image signal processor 100 may extract characteristic information of the object based on a result of interpolation performed for the image data IDATA (S104).

Afterwards, the image signal processor 100 may calculate a motion vector of the object based on the characteristic information of the object (S105), and may generate metadata MD of the object based on the calculated motion vector (S106). The image signal processor 100 may transmit the metadata MD to the timing generator control circuit 300 (S107), and the timing generator control circuit 300 may receive the metadata MD (S108) and generate a control signal based on the received metadata (S109). The timing generator control circuit 300 may transmit a control signal CS to the timing generator 220 (S110), and the timing generator 220 may receive the control signal CS (S111) and control at least one component included in the logic circuit area LC (shown in FIG. 2) based on the control signal (S112).

Figure 23:
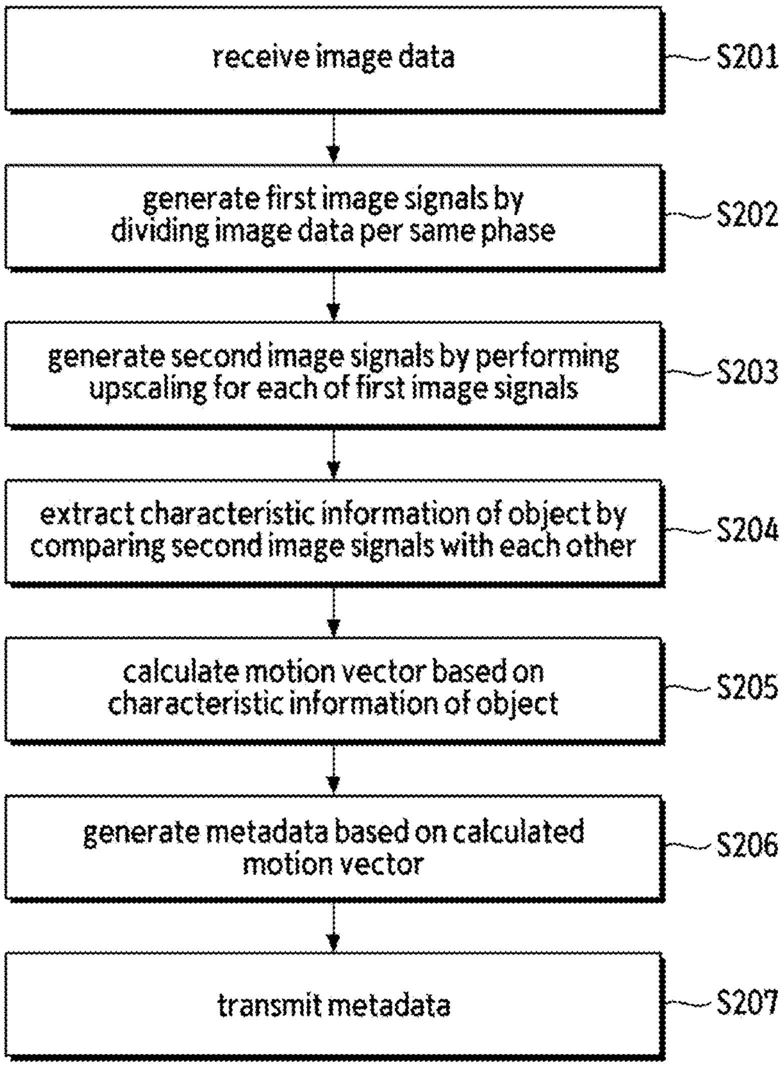
FIG. 23 is a flow chart illustrating an operating method of an image signal processor according to some embodiments.

FIG. 23 is a flow chart illustrating an operating method of an image signal processor according to some embodiments. FIGS. 24 to 27 are views illustrating an operating method of an image signal processor according to FIG. 23.

Hereinafter, the operation of the image signal processor according to some embodiments will be described with reference to FIGS. 23 to 27.

Figure 24:
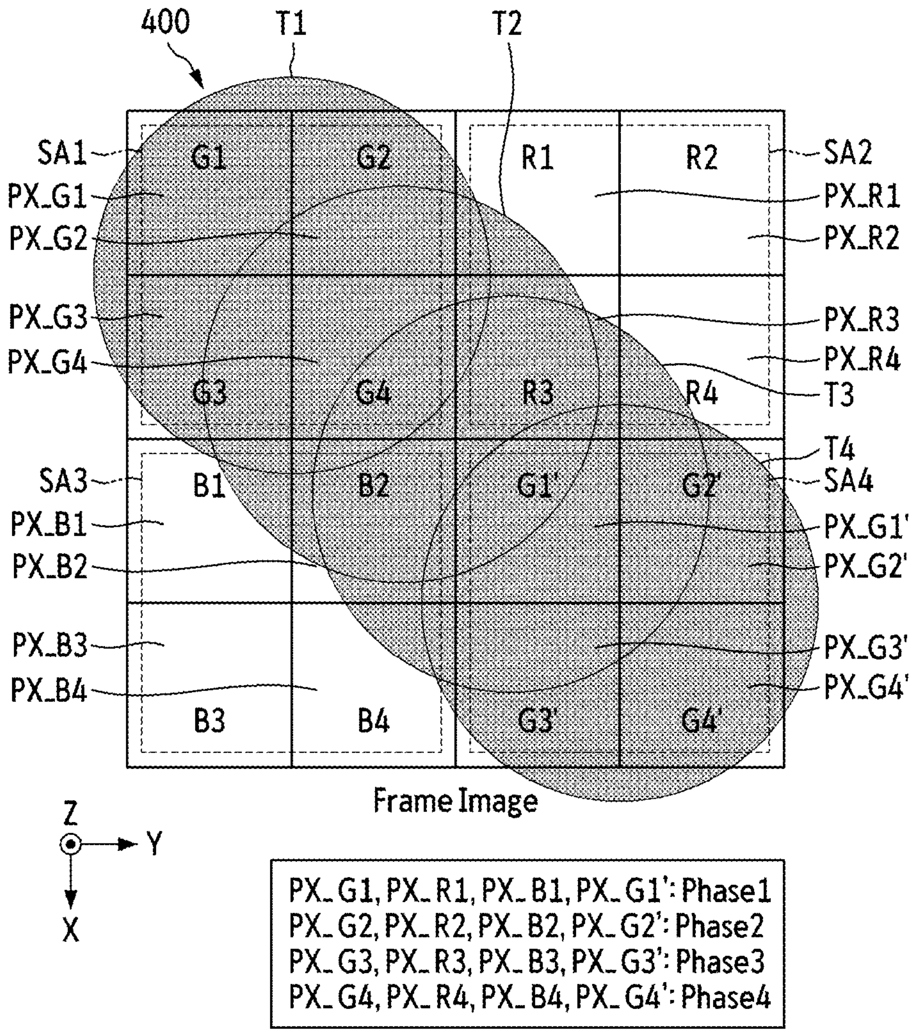
FIGS. 24 to 27 are views illustrating an operating method of an image signal processor according to FIG. 23.

First, referring to FIGS. 23 and 24, the image signal processor 100 may receive image data IDATA from the image sensor 200 (S201). The image data IDATA may be the frame image signal Frame Image shown in FIG. 20. The frame image signal Frame Image may be image data IDATA corresponding to one frame. An object 400 may move from an upper left portion to a lower right portion along a diagonal direction with respect to a plurality of pixels PX_G1, PX_G2, PX_G3, PX_G4, PX_R1, PX_R2, PX_R3, PX_R4, PX_B1, PX_B2, PX_B3, PX_B4, PX_G1', PX_G2', PX_G3' and PX_G4' disposed in a form of a matrix along the first direction X and the second direction Y while passing through a time point T1, a time point T2, a time point T3, and a time point T4.

In this case, in each of the subpixel arrays SA1 to SA4, the pixels PX_G1, PX_R1, PX_B1 and PX_G1' having a first phase Phase1, which are read out for the first time, may be read out at the time point T1, the pixels PX_G2, PX_R2, PX_B2 and PX_G2' having a second phase Phase2, which are read out for the second time, may be read out at the time point T2, the pixels PX_G3, PX_R3, PX_B3 and PX_G3' having a third phase Phase3, which are read out for the third time, may be read out at the time point T3, and the pixels PX_G4, PX_R4, PX_B4 and PX_G4' having a fourth phase Phase4, which are read out for the fourth time, may be read out at the time point T4.

That is, at the time point T1 at which the pixels PX_G1, PX_R1, PX_B1 and PX_G1' having the first phase Phase1 are read out, the object 400 may be positioned on the upper left portion with respect to the plurality of pixels PX_G1, PX_G2, PX_G3, PX_G4, PX_R1, PX_R2, PX_R3, PX_R4, PX_B1, PX_B2, PX_B3, PX_B4, PX_G1', PX_G2', PX_G3' and PX_G4', at the time point T2 at which the pixels PX_G2, PX_R2, PX_B2 and PX_G2' having the second phase Phase2 are read output, the object 400 may be positioned on a lower right portion rather than the position at the time point T1 with respect to the plurality of pixels PX_G1, PX_G2, PX_G3, PX_G4, PX_R1, PX_R2, PX_R3, PX_R4, PX_B1, PX_B2, PX_B3, PX_B4, PX_G1', PX_G2', PX_G3' and PX_G4', at the time point T3 at which the pixels PX_G3, PX_R3, PX_B3 and PX_G3' having the third phase Phase3 are read output, the object 400 may be positioned on a lower right portion rather than the position at the time point T2 with respect to the plurality of pixels PX_G1, PX_G2, PX_G3, PX_G4, PX_R1, PX_R2, PX_R3, PX_R4, PX_B1, PX_B2, PX_B3, PX_B4, PX_G1', PX_G2', PX_G3' and PX_G4', and at the time point T4 at which the pixels PX_G4, PX_R4, PX_B4 and PX_G4' having the fourth phase Phase4 are read output, the object 400 may be positioned on a lower right portion rather than the position at the time point T3 with respect to the plurality of pixels PX_G1, PX_G2, PX_G3, PX_G4, PX_R1, PX_R2, PX_R3, PX_R4, PX_B1, PX_B2, PX_B3, PX_B4, PX_G1', PX_G2', PX_G3' and PX_G4'.

Figure 25:
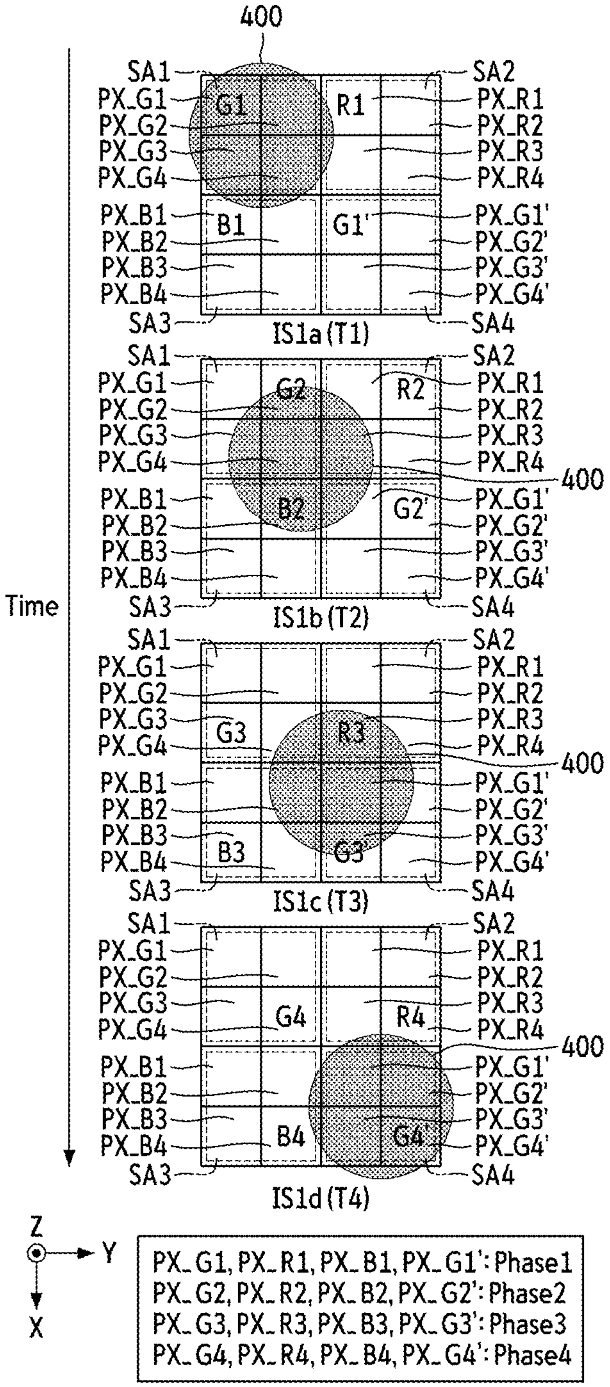

Next, referring to FIGS. 23 and 25, the image signal processor 100 may generate a plurality of first image signals IS1*a* to IS1*d* by dividing the image data IDATA per same phase (S202). Referring to FIG. 25, the image signal processor 100 may generate the first image signal IS1*a* corresponding to the time point T1, a first image signal IS1*b* corresponding to the time point T2, a first image signal IS1*c* corresponding to the time point T3, and the first image signal IS1*d* corresponding to the time point T4, respectively, by sampling the image data IDATA for each phase.

Figure 26:
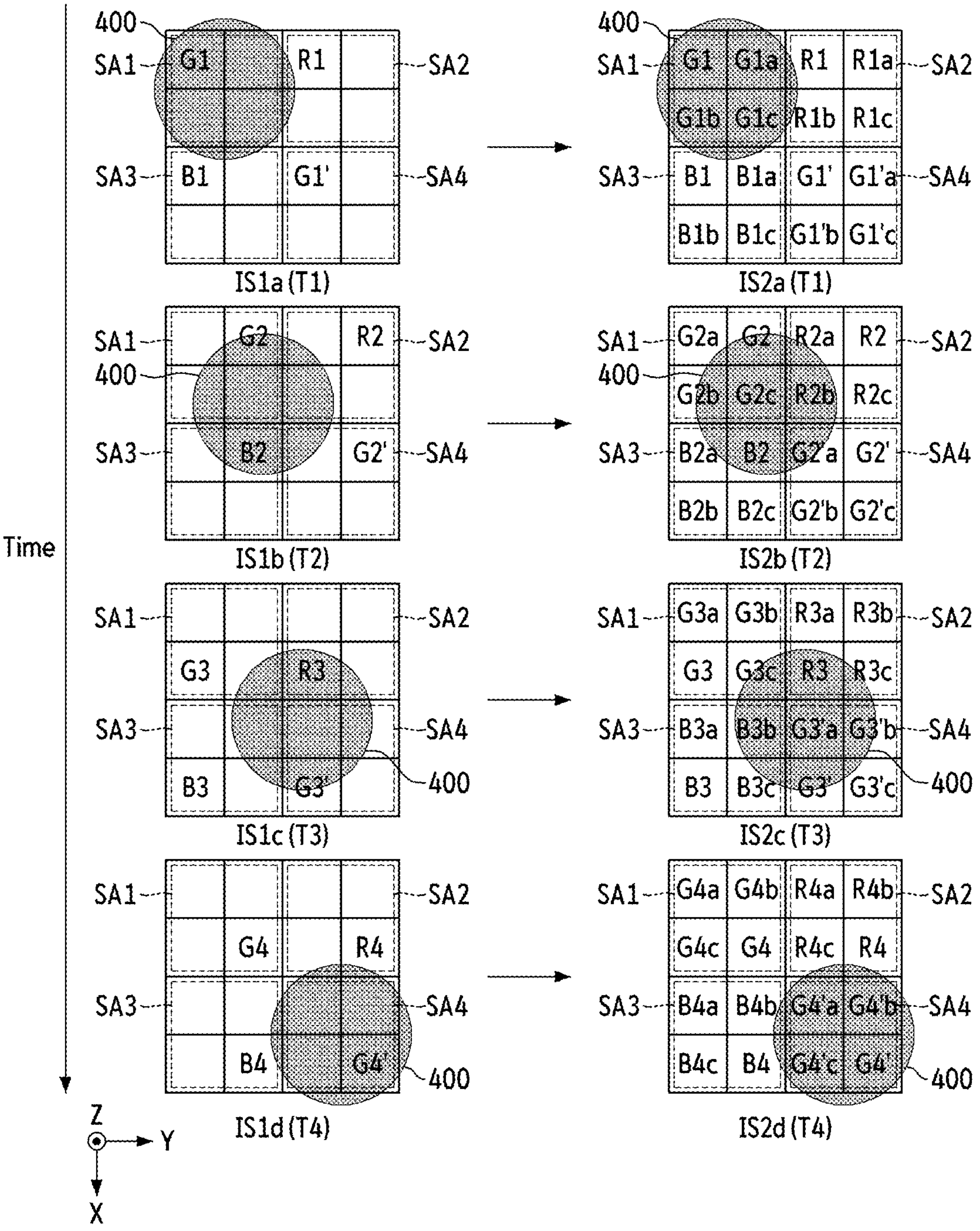

Next, referring to FIGS. 23 and 26, the image signal processor 100 may generate a plurality of second image signals IS2*a* to IS2*d* by performing upscaling for each of the plurality of first image signals IS1*a* to IS1*d* (S203).

Referring to FIG. 26, image data on a left side show the first image signal IS1*a* corresponding to the time point T1, the first image signal IS1*b* corresponding to the time point T2, the first image signal ISIc corresponding to the time point T3, and the first image signal IS1*d* corresponding to the time point T4, respectively. Image data on a right side show the second image signal IS2*a* corresponding to the time point T1, a second image signal IS2*b* corresponding to the time point T2, a second image signal IS2*c* corresponding to the time point T3, and a second image signal IS2*d* corresponding to the time point T4, respectively.

Since the first image signals IS1*a* to IS1*d* are results obtained by outputting only pixel values of pixels having the same readout time point, that is, the same phase with respect to the plurality of pixels of the pixel array, there may be portions, in which a pixel value is not output, in the image data of the first image signals IS1*a* to IS1*d*. For example, referring to the first image signal IS1*a* corresponding to the time point T1, since only the pixels PX_G1, PX_R1, PX_B1 and PX_G1' positioned on the upper left portion in the first to fourth subpixel arrays SA1 to SA4 are read out at the time point T1, the pixels PX_G2, PX_R2, PX_B2 and PX_G2' positioned on the upper right portion, the pixels PX_G3, PX_R3, PX_B3 and PX_G3' positioned on the lower left portion and the pixels PX_G4, PX_R4, PX_B4 and PX_G4' positioned on the lower right portion in the first to fourth subpixel arrays SA1 to SA4 have not been read out yet. Therefore, since pixel values of these pixels are not output yet, the pixel values of these pixels may not be included in the first image signal IS1*a* corresponding to the time point T1.

Therefore, the image signal processor 100 may first perform interpolation for the image data IDATA before calculating the motion vector of the object by processing the image data IDATA received from the image sensor 200. For example, the image signal processor 100 may generate the second image signals IS2*a* to IS2*d* shown on the right side of FIG. 26 by performing upscaling for each of the first image signals IS1*a* to IS1*d* shown on the left side of FIG. 26.

Referring to the second image signal IS2*a* corresponding to the time point T1, a pixel value that is not included in the first image signal IS1*a* corresponding to the time point T1 may be calculated using pixel values of pixels, which are known, among pixels disposed to be adjacent to a corresponding pixel. For example, since the pixel PX_G2 is not yet read out from the first image signal IS1*a* corresponding to the time point T1, the pixel value of the corresponding pixel PX_G2 is in an unknown state. In this case, the image signal processor 100 may calculate a pixel value Gla of the green pixel PX_G2 based on pixel values G1 and R1 by using the pixels values G1 and R1 of the green pixel PX_G1 and the red pixel PX_R1, which are disposed to be adjacent to the green pixel PX_G2, and in which the pixel value is output. For example, the pixel value G1*a* may be an arbitrary value between the pixel value G1 and the pixel value R1. For example, the pixel value G1*a* may be determined based on an average value of the pixel value G1 and the pixel value R1.

In this way, the image signal processor 100 may generate the second image signal IS2*a* corresponding to the time point T1, which includes output pixel values G1, R1, B1 and G1' and calculated pixel values G1*a*, G1*b*, G1*c*, R1*a*, R1*b*, R1*c*, B1*a*, B1*b*, B1*c*, G1'*a*, G1'*b* and G1'*c*, by calculating pixel values of the pixels PX_G2, PX_G3, PX_G4, PX_R2, PX_R3, PX_R4, PX_B2, PX_B3, PX_B4, PX_G2', PX_G3' and PX_G4', which are in an unknown state at the time point T1.

In the same manner, the image signal processor 100 may generate the second image signal IS2*b* corresponding to the time point T2, which includes output pixel values G2, R2, B2 and G2' and calculated pixel values G2*a*, G2*b*, G2*c*, R2*a*, R2*b*, R2*c*, B2*a*, B2*b*, B2*c*, G2'*a*, G2'*b* and G2'*c*, by calculating pixel values of the pixels PX_G1, PX_G3, PX_G4, PX_R1, PX_R3, PX_R4, PX_B1, PX_B3, PX_B4, PX_G1', PX_G3' and PX_G4', which are in an unknown state at the time point T2.

Likewise, the image signal processor 100 may generate the second image signal IS2*c* corresponding to the time point T3, which includes output pixel values G3, R3, B3 and G3' and calculated pixel values G3*a*, G3*b*, G3*c*, R3*a*, R3*b*, R3*c*, B3*a*, B3*b*, B3*c*, G3'*a*, G3'*b* and G3'*c*, by calculating pixel values of the pixels PX_G1, PX_G2, PX_G4, PX_R1, PX_R2, PX_R4, PX_B1, PX_B2, PX_B4, PX_G1', PX_G2' and PX_G4', which are in an unknown state at the time point T3. The image signal processor 100 may generate the second image signal IS2*d* corresponding to the time point T4, which includes output pixel values G4, R4, B4 and G4' and calculated pixel values G4*a*, G4*b*, G4*c*, R4*a*, R4*b*, R4*c*, B4*a*, B4*b*, B4*c*, G4'*a*, G4'*b* and G4'*c*, by calculating pixel values of the pixels PX_G1, PX_G2, PX_G3, PX_R1, PX_R2, PX_R3, PX_B1, PX_B2, PX_B3, PX_G1', PX_G2' and PX_G3', which are in an unknown state at the time point T4.

Figure 27:
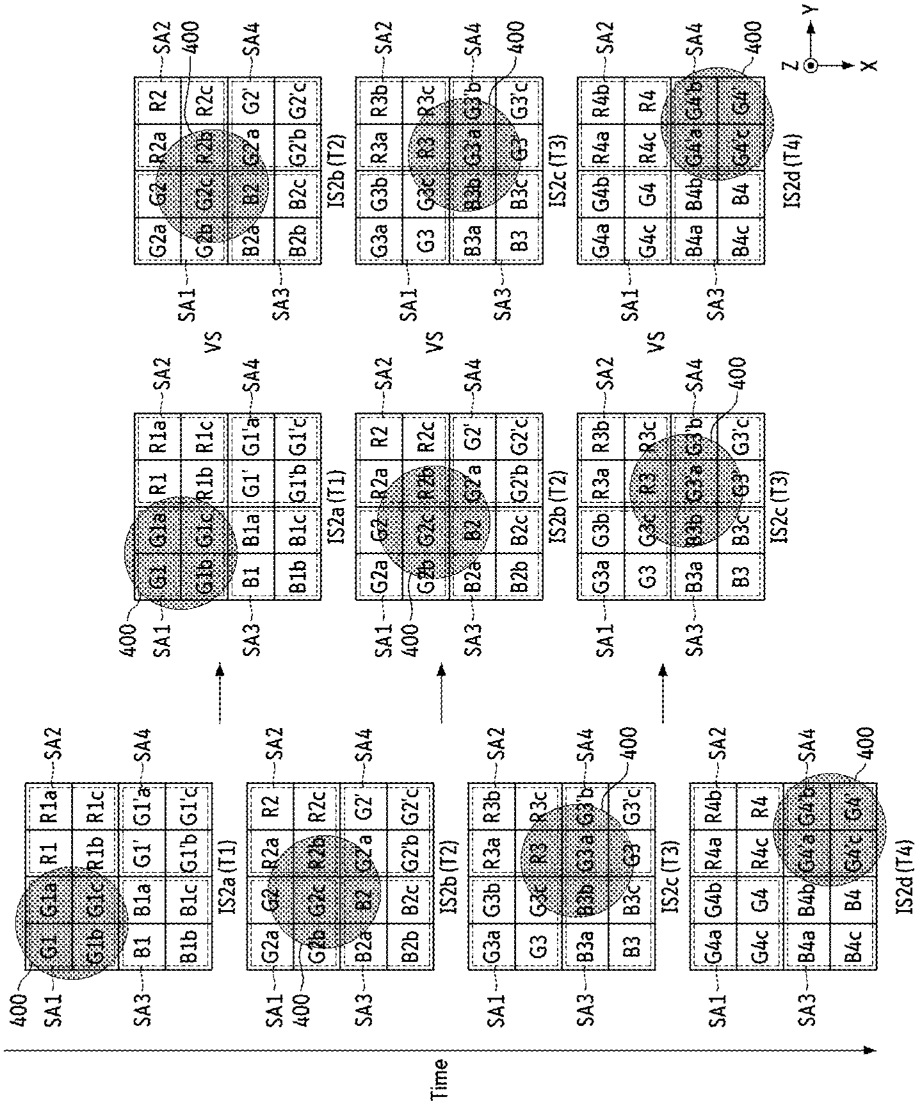

Next, referring to FIGS. 23 and 27, the image signal processor 100 may extract characteristic information of the object 400 by comparing the plurality of second image signals IS2*a* to IS2*d* (S204), and may calculate a motion vector of the object 400 based on the extracted characteristic information of the object 400 (S205). The image signal processor 100 may compare the plurality of second image signals IS2*a* to IS2*d* for each time point. For example, referring to FIG. 27, the image signal processor 100 may compare the second image signal IS2*a* corresponding to the time point T1 with the second image signal IS2*b* corresponding to the time point T2 to extract the characteristic information of the object 400 and calculate the motion vector of the object 400.

The image signal processor 100 may identify information on a time difference between the time point T1 and the time point T2. Also, the image signal processor 100 may compare a position of the object 400 in the second image signal IS2*a* corresponding to the time point T1 with a position of the object 400 in the second image signal IS2*a* corresponding to the time point T2 to identify a moving distance of the object 400 in the first direction X and a moving distance of the object 400 in the second direction Y during the time difference from the time point T1 to the time point T2.

For example, the image signal processor 100 may extract characteristic information of the object 400, which indicates that the time difference between the time point T1 and the time point T2 is 1 ms and that the object 400 has moved by one pixel during the time difference from the time point T1 to the time point T2. In this case, the image signal processor 100 may calculate a speed of the object 400 to be 1 pixel/ms based on the characteristic information of the object 400. The information on the calculated speed of the object 400 may be included in the metadata MD related to the motion vector of the object 400.

Likewise, the image signal processor 100 may compare the second image signal IS2*b* corresponding to the time point T2 with the second image signal IS2*c* corresponding to the time point T3 to extract the characteristic information of the object 400 and calculate the motion vector of the object 400, and may compare the second image signal IS2*c* corresponding to the time point T3 with the second image signal IS2*d* corresponding to the time point T4 to extract the characteristic information of the object 400 and calculate the motion vector of the object 400.

For example, the image signal processor 100 may identify the moving distance of the object 400 in the first direction X and the moving distance of the object 400 in the second direction Y during the time difference from the time point T2 to the time point T3 by comparing a position of the object 400 in the second image signal IS2*b* corresponding to the time point T2 with a position of the object 400 in the second image signal IS2*c* corresponding to the time point T3. Furthermore, since the image signal processor 100 identifies the information on the time difference between the time point T2 and the time point T3, the image signal processor 100 may calculate the speed of the object 400 during the time period from the time point T2 to the time point T3 based on the extracted characteristic information of the object 400. Afterwards, the image signal processor 100 may calculate acceleration of the object 400 by comparing the speed information of the object 400 during the time period from the time point T1 to the time point T2 with the speed information of the object 400 during the time period from the time point T2 to the time point T3.

In addition, the image signal processor 100 may generate information on an expected moving path of the object 400 by analyzing a moving path of the object 400 from the time point T1 to the time point T4. The information on the acceleration of the object 400 and the information on the moving path of the object 400 may be included in the metadata MD on the motion vector of the object 400.

Next, the image signal processor 100 may transmit the generated metadata MD to the timing generator control circuit 300 (S207).

Figure 28:
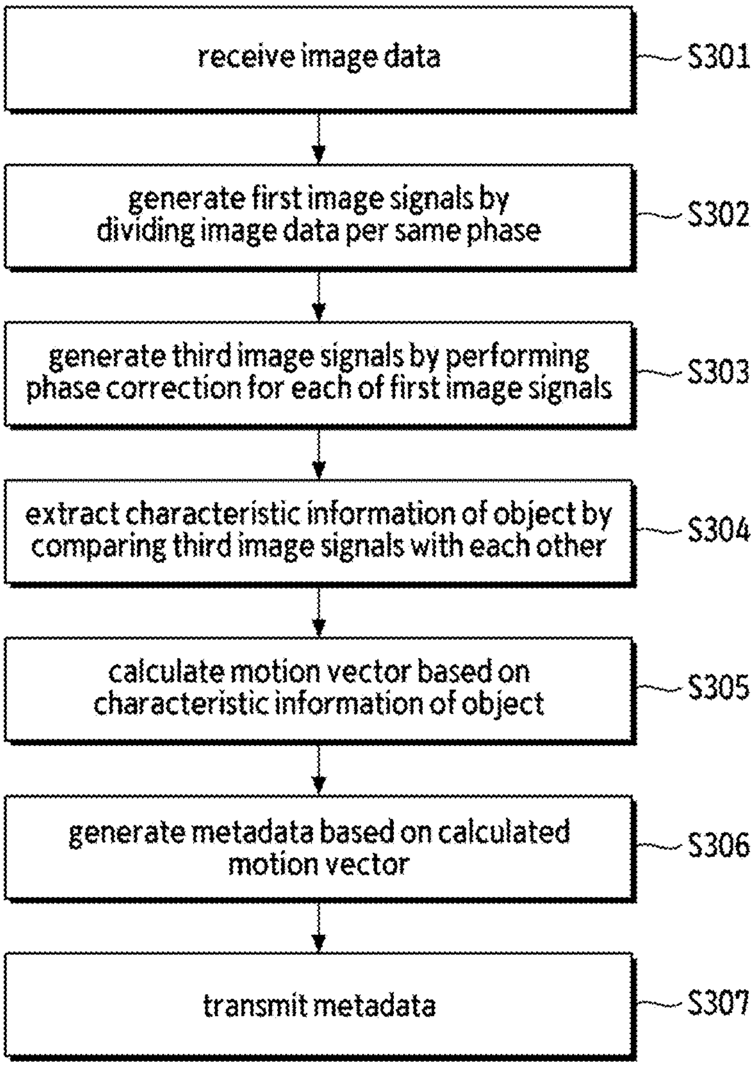
FIG. 28 is a flow chart illustrating an operating method of an image signal processor according to some embodiments.
Figure 29:
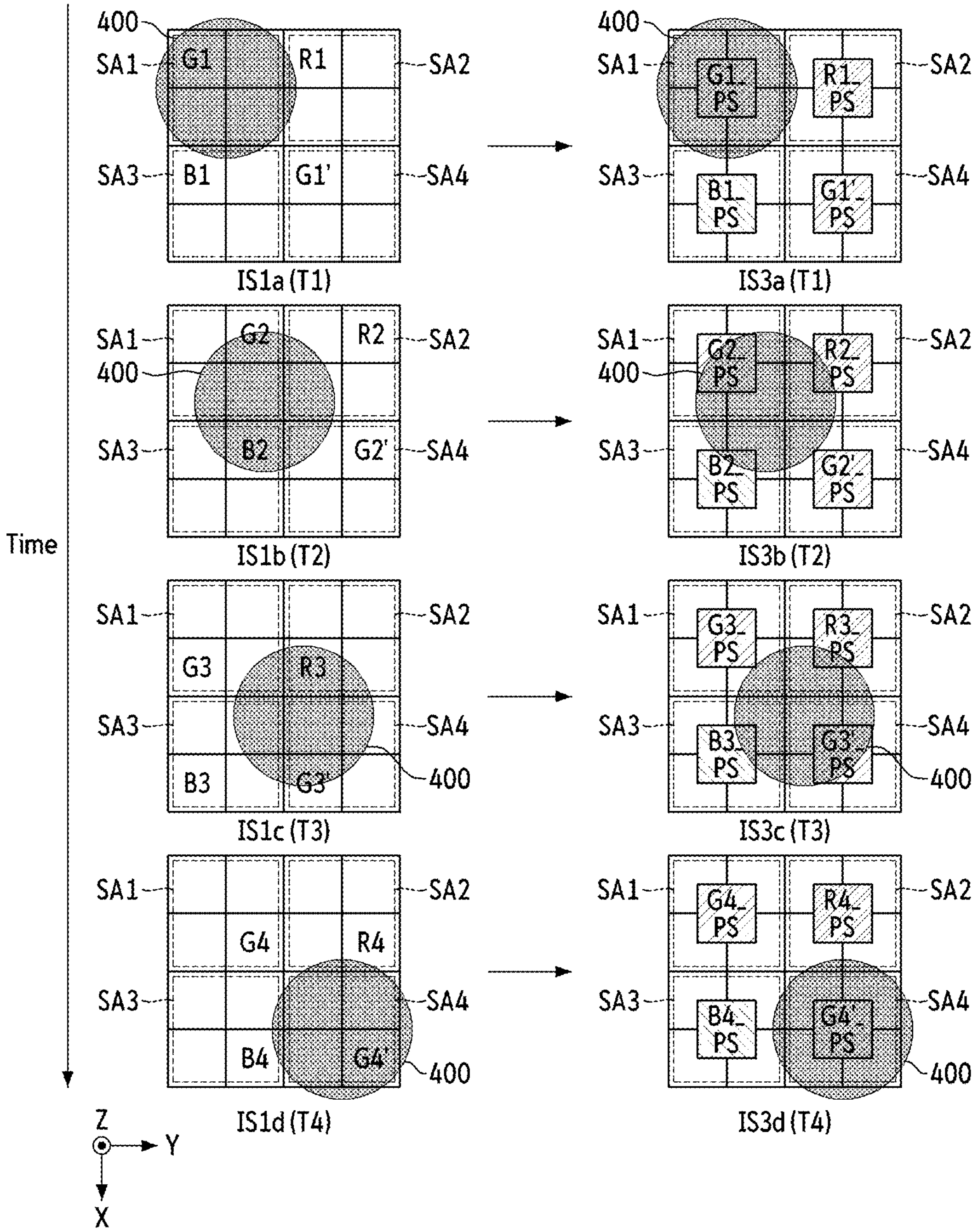
FIGS. 29 and 30 are views illustrating an operating method of an image signal processor according to FIG. 28.
Figure 30:
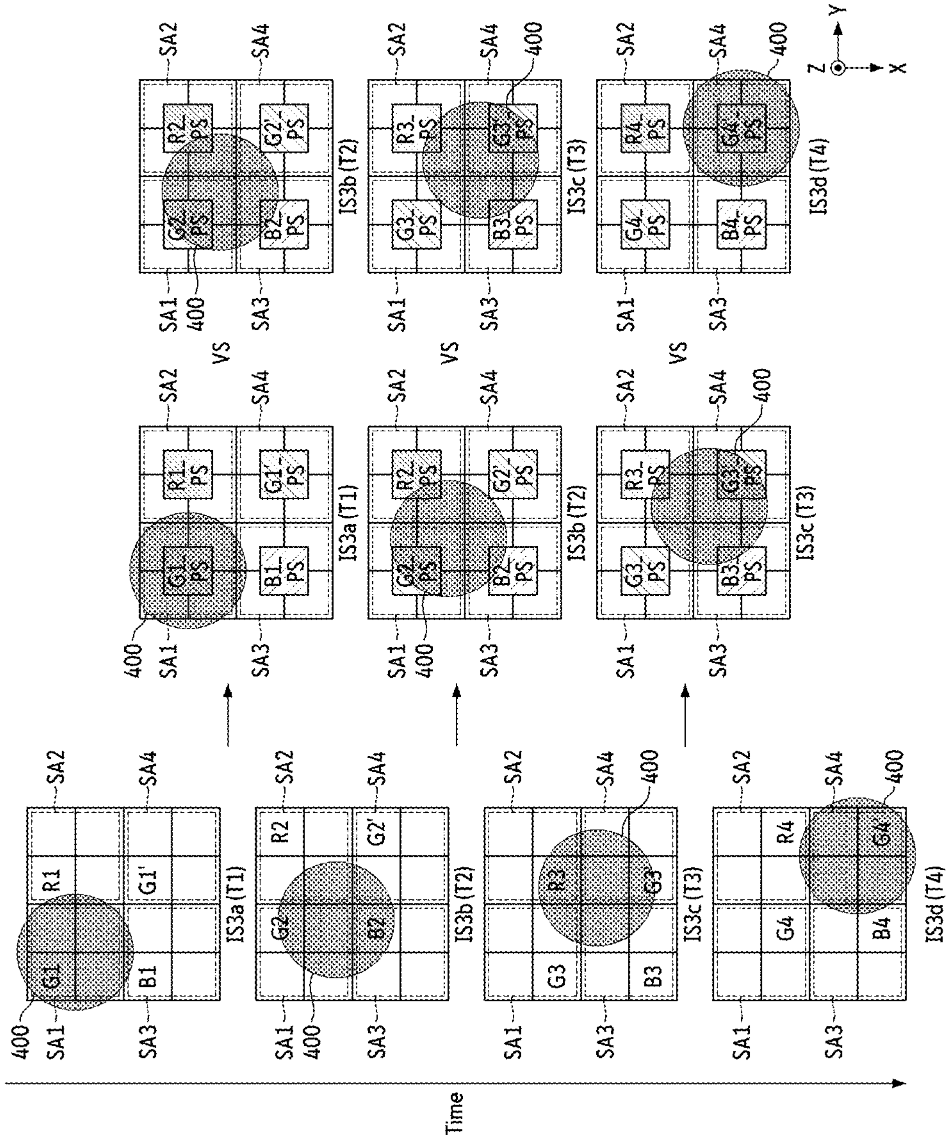

FIG. 28 is a flow chart illustrating an operating method of an image signal processor according to some embodiments. FIGS. 29 and 30 are views illustrating an operating method of an image signal processor according to FIG. 28.

Referring to FIG. 28, step S301 of receiving the image data IDATA by the image signal processor 100 from the image sensor 200 and step S302 of generating a plurality of first image signals IS1*a* to IS1*d* by dividing the image data IDATA per same phase may be the same as or similar to those described with reference to FIGS. 23 to 25, a redundant description will be omitted below.

Referring to FIGS. 28 and 29, the image signal processor 100 may generate a plurality of third image signals IS3*a* to IS3*d* by performing phase correction for each of the plurality of first image signals IS1*a* to IS1*d* (S303).

Referring to FIG. 29, image data on a left side show the first image signal IS1*a* corresponding to the time point T1, the first image signal IS1*b* corresponding to the time point T2, the first image signal IS1*c* corresponding to the time point T3, and the first image signal IS1*d* corresponding to the time point T4, respectively, and image data on a right side show the third image signal IS3*a* corresponding to the time point T1, a third image signal IS3*b* corresponding to the time point T2, a third image signal IS3*c* corresponding to the time point T3, and the third image signal IS3*d* corresponding to the time point T4, respectively.

Since the first image signals IS1*a* to IS1*d* shown on the left side of FIG. 29 are results obtained by outputting only pixel values of pixels having the same readout time point, that is, the same phase with respect to the plurality of pixels included in the pixel array, there may be portions, in which a pixel value is not output, in the image data of the first image signals IS1*a* to IS1*d*.

Therefore, before calculating the motion vector of the object 400, the image signal processor 100 may first perform interpolation for the image data IDATA by processing the image data IDATA received from the image sensor 200. For example, the image signal processor 100 may generate the third image signals IS3*a* to IS3*d* shown on the right side of FIG. 29 by performing phase correction for each of the first image signals IS1*a* to IS1*d* shown on the left side of FIG. 29.

Referring to the first image signals IS1*a* to IS1*d* shown on the left side of FIG. 29, the first image signal IS1*a* corresponding to the time point T1 may include only pixel values G1, R1, B1 and G1' output from the pixels PX_G1, PX_R1, PX_B1 and PX_G1' disposed on the upper left portion among the plurality of pixels included in each of the first to fourth subpixel arrays SA1 to SA4. Also, the first image signal IS1*b* corresponding to the time point T2 may include only pixel values G2, R2, B2 and G2' output from the pixels PX_G2, PX_R2, PX_B2 and PX_G2' disposed on the upper right portion among the plurality of pixels included in each of the first to fourth subpixel arrays SA1 to SA4. Also, the first image signal IS1*c* corresponding to the time point T3 may include only pixel values G3, R3, B3 and G3' output from the pixels PX_G3, PX_R3, PX_B3 and PX_G3' disposed on the lower left portion among the plurality of pixels included in each of the first to fourth subpixel arrays SA1 to SA4. Also, the first image signal IS1*d* corresponding to the time point T4 may include only pixel values G4, R4, B4 and G4' output from the pixels PX_G4, PX_R4, PX_B4 and PX_G4' disposed on the lower right portion among the plurality of pixels included in each of the first to fourth subpixel arrays SA1 to SA4.

In this way, since the pixel values included in each of the first image signals IS1*a* to IS1*d* corresponding to different time points are output from the pixels disposed in different positions, the image signal processor 100 may perform interpolation for correcting the phase of the pixel that outputs the pixel value in each of the plurality of first image signals IS1*a* to IS1*d*, before extracting the characteristic information of the object 400 by comparing the plurality of first image signals IS1*a* to IS1*d* for each time point.

For example, the image signal processor 100 may change a phase occupied by the green pixel PX_G1, which outputs the pixel value among the green pixels PX_G1, PX_G2, PX_G3 and PX_G4 included in the first subpixel array SA1 with respect to the first image signal IS1*a* corresponding to the time point T1, in the first image signal IS1*a* corresponding to the time point T1, to that of a central portion of the first subpixel array SA1. Also, the image signal processor 100 may change a phase occupied by the red pixel PX_R1, which outputs the pixel value among the red pixels PX_R1, PX_R2, PX_R3 and PX_R4 included in the second subpixel array SA2 with respect to the first image signal IS1*a* corresponding to the time point T1, in the first image signal IS1*a* corresponding to the time point T1, to that of a central portion of the second subpixel array SA2.

Furthermore, the image signal processor 100 may change a phase occupied by the blue pixel PX_B1, which outputs the pixel value among the blue pixels PX_B1, PX_B2, PX_B3 and PX_B4 included in the third subpixel array SA3 with respect to the first image signal IS1*a* corresponding to the time point T1, in the first image signal IS1*a* corresponding to the time point T1, to that of a central portion of the third subpixel array SA3. Also, the image signal processor 100 may change a phase occupied by the green pixel PX_G1', which outputs the pixel value among the green pixels PX_G1', PX_G2', PX_G3' and PX_G4' included in the fourth subpixel array SA4 with respect to the first image signal IS1*a* corresponding to the time point T1, in the first image signal IS1*a* corresponding to the time point T1, to that of a central portion of the fourth subpixel array SA4. Therefore, the image signal processor 100 may generate the third image signal IS3*a* corresponding to the time point T1 shown on the right side of FIG. 29.

The third image signal IS3*a* corresponding to the time point T1 may include a pixel value G1_PS of the green pixel having the corrected phase, a pixel value R1_PS of the red pixel having the corrected phase, a pixel value B1_PS of the blue pixel having the corrected phase, and a pixel value G1'_PS of the green pixel having the corrected phase. In this case, the pixel value G1_PS of the green pixel having the corrected phase may be the same as the pixel value G1 included in the first image signal IS1*a* corresponding to the time point T1, the pixel value R1_PS of the red pixel having the corrected phase may be the same as the pixel value R1 included in the first image signal IS1*a* corresponding to the time point T1, the pixel value B1_PS of the blue pixel having the corrected phase may be the same as the pixel value B1 included in the first image signal IS1*a* corresponding to the time point T1, and the pixel value G1'_PS of the green pixel having the corrected phase may be the same as the pixel value G1' included in the first image signal IS1*a* corresponding to the time point T1. However, the image signal processor 100 may recognize that a position of the green pixel that outputs the pixel value G1_PS in the third image signal IS3*a*, compared with a position of the green pixel that outputs the pixel value G1 included in the first image signal IS1*a*, is moved toward the central portion of the first subpixel array SA1, that is, a portion where the plurality of pixels PX_G1, PX_G2, PX_G3 and PX_G4 are in contact with one another. Also, the image signal processor 100 may recognize that a position of the red pixel that outputs the pixel value R1_PS in the third image signal IS3*a*, compared with a position of the red pixel that outputs the pixel value R1 included in the first image signal IS1*a*, is moved toward the central portion of the second subpixel array SA2, that is, a portion where the plurality of pixels PX_R1, PX_R2, PX_R3 and PX_R4 are in contact with one another.

Furthermore, the image signal processor 100 may recognize that a position of the blue pixel that outputs the pixel value B1_PS in the third image signal IS3*a*, compared with a position of the blue pixel that outputs the pixel value B1 included in the first image signal IS1*a*, is moved toward the central portion of the third subpixel array SA3, that is, a portion where the plurality of pixels PX_B1, PX_B2, PX_B3 and PX_B4 are in contact with one another. Also, the image signal processor 100 may recognize that a position of the green pixel that outputs the pixel value G1'_PS in the third image signal IS3*a*, compared with a position of the green pixel that outputs the pixel value G1' included in the first image signal IS1*a*, is moved toward the central portion of the fourth subpixel array SA4, that is, a portion where the plurality of pixels PX_G1', PX_G2', PX_G3' and PX_G4' are in contact with one another.

In the same way, the image signal processor 100 may generate the third image signal IS3*b* corresponding to the time point T2 by performing interpolation for correcting the phase for the first image signal IS1*b* corresponding to the time point T2, generate the third image signal IS3*c* corresponding to the time point T3 by performing interpolation for correcting the phase for the first image signal ISIc corresponding to the time point T3, and generate the third image signal IS3*d* corresponding to the time point T4 by performing interpolation for correcting the phase for the first image signal IS1*d* corresponding to the time point T4.

Referring to the plurality of third image signals IS3*a* to IS3*d* shown on the right side of FIG. 29, the phase of the green pixel of the first subpixel array SA1, the phase of the red pixel of the second subpixel array SA2, the phase of the blue pixel of the third subpixel array SA3 and the phase of the green pixel of the fourth subpixel array SA4, which output the pixel value in the third image signal, may be the same for each time point.

Therefore, referring to FIGS. 28 and 30, the image signal processor 100 may extract the characteristic information of the object 400 by comparing the plurality of third image signals IS3*a* to IS3*d* with each other (S304) and calculate the motion vector of the object based on the extracted characteristic information of the object (S305).

In addition, the image signal processor 100 may generate metadata based on the motion vector of the object 400 (S306) and transmit the generated metadata MD to the timing generator control circuit 300 (S307).

For example, referring to FIG. 30, the image signal processor 100 may identify that the object 400 has moved from the upper left portion to the lower right portion based on the green pixel having the corrected phase of the first subpixel array SA1 during the time difference from the time point T1 to the time point T2 by comparing the third image signal IS3*a* corresponding to the time point T1 with the third image signal IS3*b* corresponding to the time point T2.

In this way, the image signal processor 100 may generate metadata MD including information such as speed and acceleration by calculating the motion vector of the object 400 based on the extracted characteristic information of the object 400.

The description of steps S304 to S307 in the operation of the image signal processor 100 may be the same as or similar to the description of steps S204 to S207 described with reference to FIG. 23, and thus a redundant description will be omitted below.

In the embodiments described with reference to FIGS. 28 to 30, the “phase” of step S302 in FIG. 28 may be different from the meaning of the “phase” of step S303 in FIG. 28. For example, the “phase” of step S302 in FIG. 28 may be determined in accordance with a readout order of the readout circuit of the plurality of pixels included in the same subpixel array. That is, the plurality of pixels included in the same subpixel array may not be simultaneously readout but sequentially readout in a predetermined order and thus pixels that are read out in the predetermined order have different “phases”. On the other hand, the “phase” of step S303 in FIG. 28 may mean a physical position of a pixel that outputs a pixel value included in the image data IDATA output from the image sensor 200, that is, a physical position occupied by a pixel having a pixel value, which is read out at a specific time point and outputs as part of image data IDATA, in the pixel array.

Figure 31:
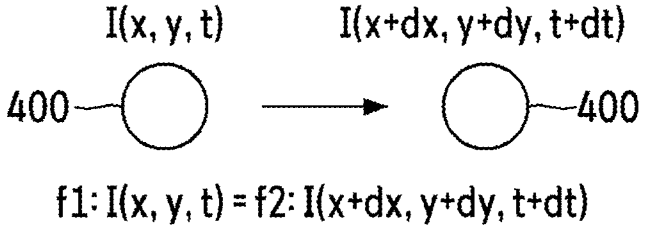
FIG. 31 is a view illustrating an example in which an image signal processor according to some embodiments calculates a motor vector.

FIG. 31 is a view illustrating an example in which an image signal processor according to some embodiments calculates a motor vector.

Referring to FIG. 31, the object 400 may move during the time period between the time points T1 and T2. In this case, the image signal processor 100 may specify coordinates of the object 400 in the image data corresponding to the time point T1 as f1. In addition, the image signal processor 100 may specify coordinates of the object 400 in the image data corresponding to the time point T2 as f2.

In some embodiments, the image signal processor 100 may calculate a movement amount dx of the object 400 in a direction x, a movement amount dy of the object 400 in a direction y, and a time difference dx between the time point T1 and the time point T2 based on Equation 1 as follows, and may generate metadata on the motion vector of the object 400 based on the calculated results.

$$f1: I(x, y, t) = f2: I(x+dx, y+dy, t+dt) \quad \text{(Equation 1)}$$

Figure 32:
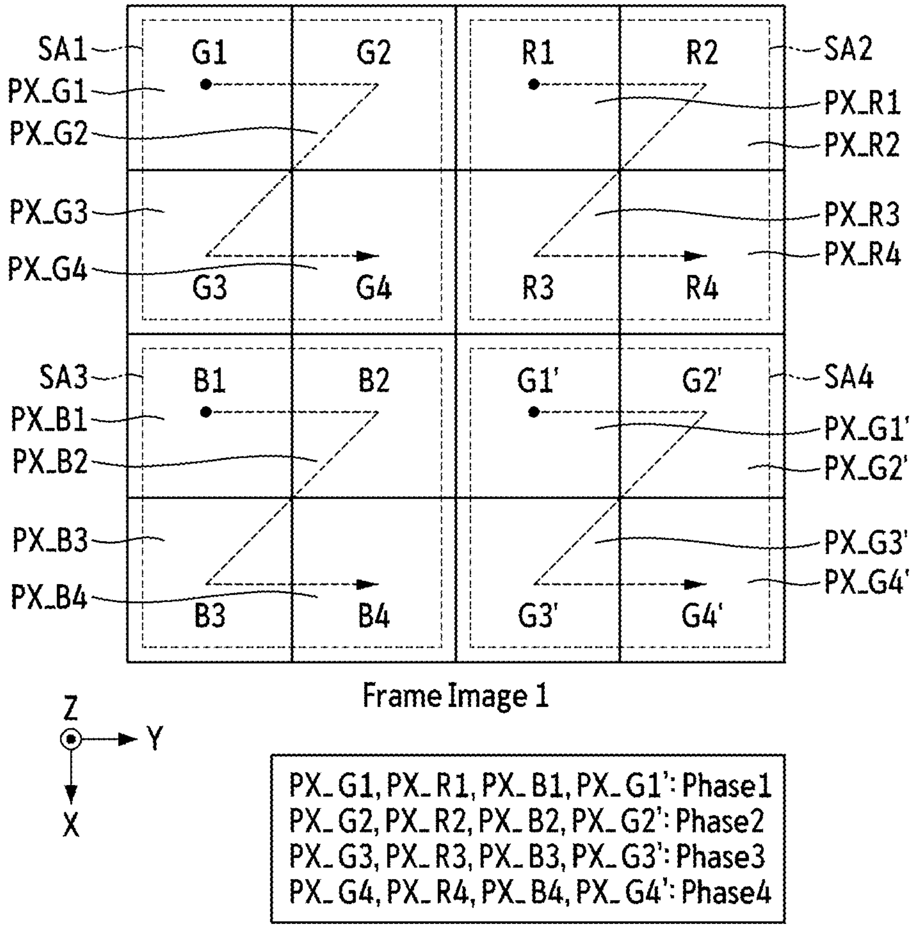
FIG. 32 is a view illustrating a first frame image signal generated by an image sensor according to some embodiments.
Figure 33:
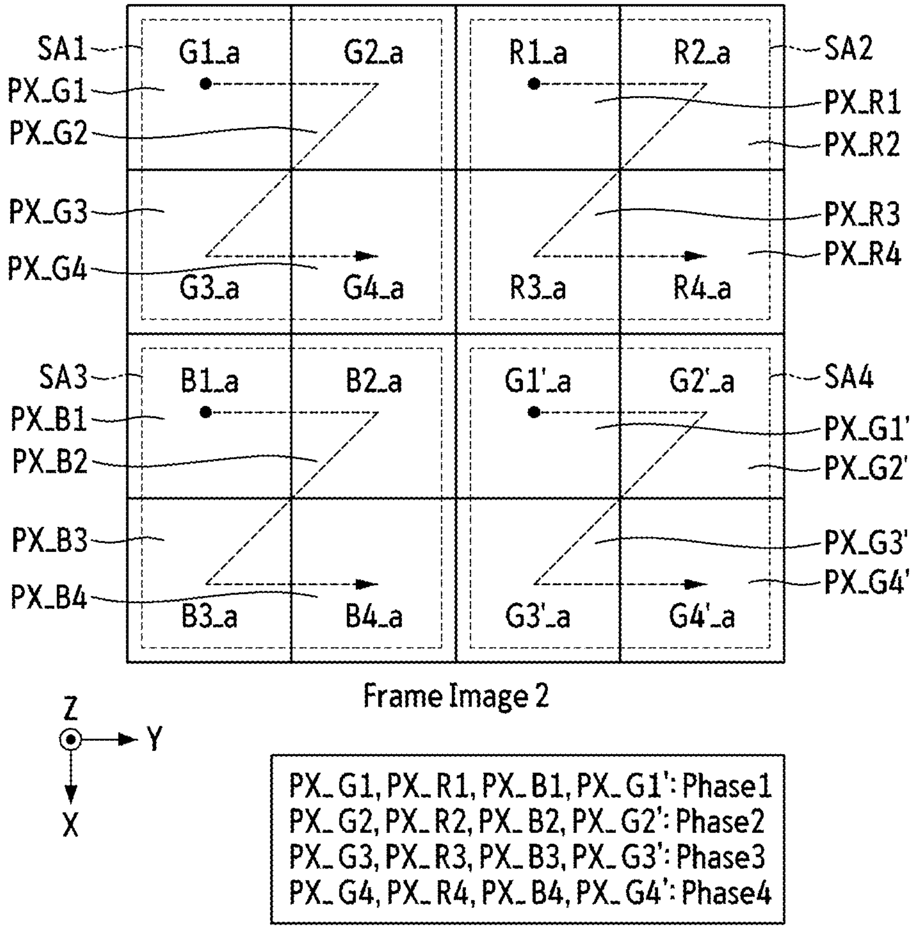
FIG. 33 is a view illustrating a second frame image signal generated by an image sensor according to some embodiments.

FIG. 32 is a view illustrating a first frame image signal generated by an image sensor according to some embodiments. FIG. 33 is a view illustrating a second frame image signal generated by an image sensor according to some embodiments.

Referring to FIGS. 32 and 33, a first frame image signal Frame Image1 of FIG. 32 may be image data IDATA output by the image sensor 200 during a first frame time period, and a second frame image signal Frame Image2 of FIG. 33 may be image data IDATA output by the image sensor 200 during a second frame time period after the first frame time period.

At the first frame time period and the second frame time period, the readout circuit 240 of the image sensor 200 may perform the readout operation in the same order for the plurality of pixels included in the same subpixel array. For example, as shown in FIGS. 32 and 33, the readout circuit 240 may perform the readout operation in the order of the pixel disposed on the upper left portion, the pixel disposed on the upper right, the pixel disposed on the lower left portion, and the pixel disposed on the lower right portion.

Referring to FIG. 32, green pixel values G1, G2, G3 and G4 may be image data respectively output from the green pixels PX_G1, PX_G2, PX_G3 and PX_G4 of the first subpixel array SA1 during the first frame time period, red pixel values R1, R2, R3 and R4 may be image data respectively output from the red pixels PX_R1, PX_R2, PX_R3 and PX_R4 of the second subpixel array SA2 during the first frame time period, blue pixel values B1, B2, B3 and B4 may be image data respectively output from the blue pixels PX_B1, PX_B2, PX_B3 and PX_B4 of the third subpixel array SA3 during the first frame time period, and green pixel values G1', G2', G3' and G4' may be image data respectively output from the green pixels PX_G1', PX_G2', PX_G3' and PX_G4' of the fourth subpixel array SA4 during the first frame time period.

Referring to FIG. 33, green pixel values G1_*a*, G2_*a*, G3_*a* and G4_*a* may be image data respectively output from the green pixels PX_G1, PX_G2, PX_G3 and PX_G4 of the first subpixel array SA1 during the second frame time period, red pixel values R1_*a*, R2_*a*, R3_*a* and R4_*a* may be image data respectively output from the red pixels PX_R1, PX_R2, PX_R3 and PX_R4 of the second subpixel array SA2 during the second frame time period, blue pixel values B1_*a*, B2_*a*, B3_*a* and B4_*a* may be image data respectively output from the blue pixels PX_B1, PX_B2, PX_B3 and PX_B4 of the third subpixel array SA3 during the second frame time period, and green pixel values G1'_a, G2'_a, G3'_a and G4'_a may be image data respectively output from the green pixels PX_G1', PX_G2', PX_G3' and PX_G4' of the fourth subpixel array SA4 during the second frame time period.

As the object 400, which is a sensing target of the image sensor 200, moves during the first frame time period and the second frame time period subsequent to the first frame time period, the pixel value output during the first frame time period and the pixel value output during the second frame time period, which are output by the same pixel, may be different from each other. For example, the pixel value G1 (shown in FIG. 32) output from the green pixel PX_G1 during the first frame time period may be different from the pixel value G1_*a*(shown in FIG. 33) output from the green pixel PX_G1 during the second frame time period.

Figure 34:
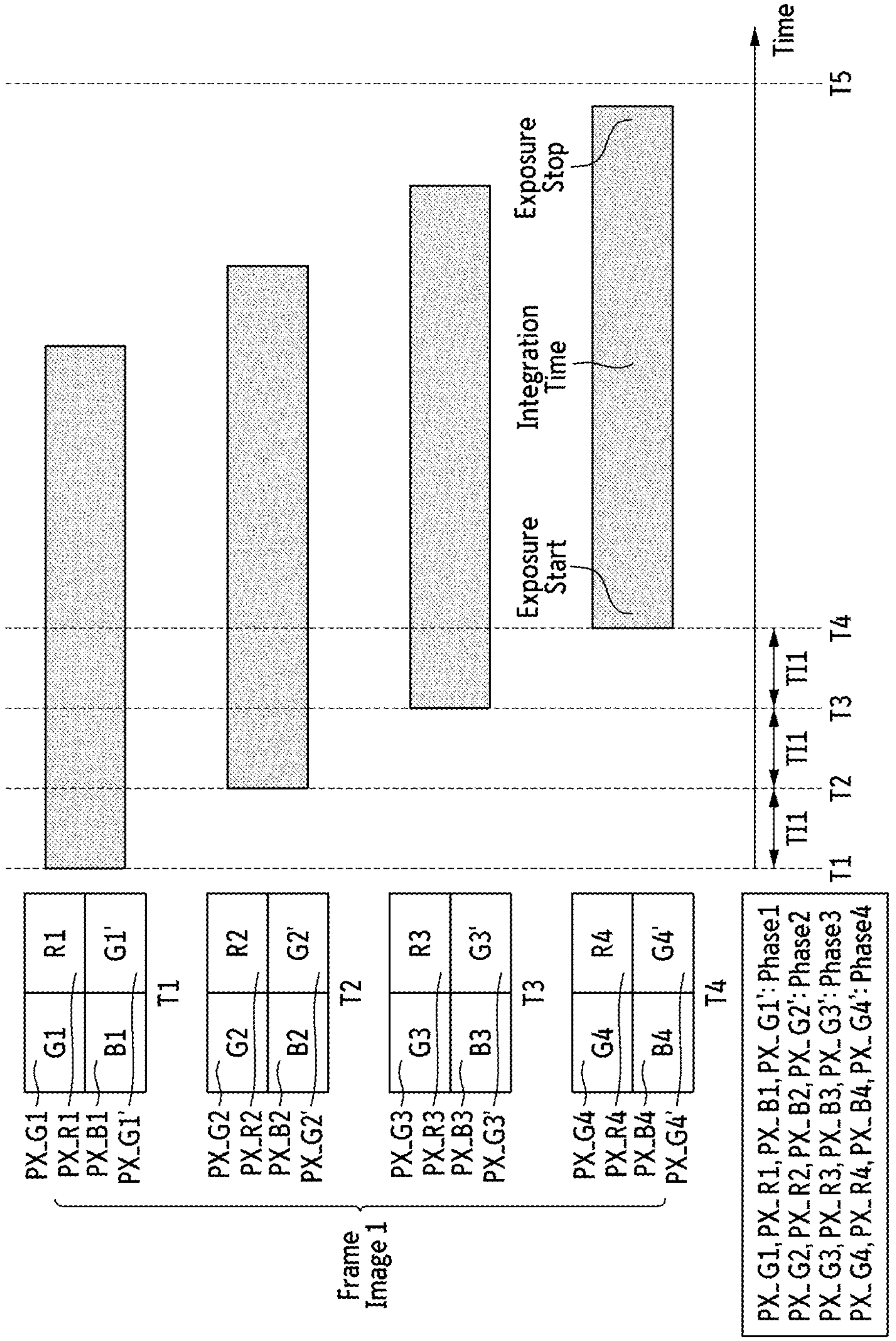
FIG. 34 is a view illustrating a start time point of an integration time for each subpixel array with respect to a first frame image signal of an image sensor according to some embodiments.

FIG. 34 is a view illustrating a start time point of an integration time for each subpixel array with respect to a first frame image signal of an image sensor according to some embodiments.

Referring to FIGS. 32 and 34, the first frame image signal Frame Image1 may be a set of pixel values G1, R1, B1, G1' output from pixels PX_G1, PX_R1, PX_B1 and PX_G1' which start to perform charge accumulation, that is, the integration at the time point T1, pixel values G2, R2, B2 and G2' output from pixels PX_G2, PX_R2, PX_B2 and PX_G2' which start to perform the integration at the time point T2, pixel values G3, R3, B3 and G3' output from pixels PX_G3, PX_R3, PX_B3 and PX_G3' which start to perform the integration at the time point T3, and pixel values G4, R4, B4, PX_B4 and G4' output from pixels PX_G4, PX_B4 and PX_G4' which start to perform the integration at the time point T4.

In this case, the start time point of the integration time of the pixels PX_G1, PX_R1, PX_B1 and PX_G1' having the first phase Phase1 may be the time point T1. That is, the time point at which photocharges included in each of the pixels PX_G1, PX_R1, PX_B1 and PX_G1' having the first phase Phase1, which are first read out in each of the subpixel arrays, start to be accumulated may be the same as the time point T1.

The start time point of the integration time of the pixels PX_G2, PX_R2, PX_B2 and PX_G2' having the second phase Phase2 may be the time point T2 after the time point T1. That is, the time point at which photocharges included in each of the pixels having the second phase Phase2, which are read out after the pixels having the first phase Phase1 in each of the subpixel arrays, start to be accumulated may be the same as the time point T2.

As described above, since the plurality of pixels included in the same subpixel array share the analog-to-digital converter, a time difference equivalent to a time interval TI1 may occur between the start time point T1 of the integration time of the pixels PX_G1, PX_R1, PX_B1 and PX_G1' having the first phase Phase1 and the start time point T2 of the integration time of the pixels PX_G2, PX_R2, PX_B2 and PX_G2' having the second phase Phase2.

The start time point of the integration time of the pixels PX_G3, PX_R3, PX_B3 and PX_G3' having the third phase Phase3 may be the time point T3 after the time point T2. That is, the time point at which photocharges included in each of the pixels having the third phase Phase3, which are read out after the pixels having the second phase Phase2 in each of the subpixel arrays, start to be accumulated may be the same as the time point T3.

As described above, since the plurality of pixels included in the same subpixel array share the analog-to-digital converter, a time difference equivalent to the time interval TI1 may occur between the start time point T2 of the integration time of the pixels PX_G2, PX_R2, PX_B2 and PX_G2' having the second phase Phase2 and the start time point T3 of the integration time of the pixels PX_G3, PX_R3, PX_B3 and PX_G3' having the third phase Phase3.

The start time point of the integration time of the pixels PX_G4, PX_R4, PX_B4 and PX_G4' having the fourth phase Phase4 may be the time point T4 after the time point T3. That is, the time point at which photocharges included in each of the pixels having the fourth phase Phase4, which are read out after the pixels having the third phase Phase3 in each of the subpixel arrays, start to be accumulated may be the same as the time point T4.

As described above, since the plurality of pixels included in the same subpixel array share the analog-to-digital converter, a time difference equivalent to the time interval TI1 may occur between the start time point T3 of the integration time of the pixels PX_G3, PX_R3, PX_B3 and PX_G3' having the third phase Phase3 and the start time point T4 of the integration time of the pixels PX_G4, PX_R4, PX_B4 and PX_G4' having the fourth phase Phase4.

In this case, the start time point of the integration time of the pixels may be controlled by the timing generator 220 of the image sensor 200. That is, the timing generator 220 may provide an operation timing control signal to the row driver circuit 210 such that the start time point of the integration time of the pixels PX_G1, PX_R1, PX_B1 and PX_G1' having the first phase Phase1 may be adjusted to be the time point T1, the start time point of the integration time of the pixels PX_G2, PX_R2, PX_B2 and PX_G2' having the second phase Phase2 may be adjusted to be the time point T2, the start time point of the integration time of the pixels PX_G3, PX_R3, PX_B3 and PX_G3' having the third phase Phase3 may be adjusted to be the time point T3, and the start time point of the integration time of the pixels PX_G4, PX_R4, PX_B4 and PX_G4' having the fourth phase Phase4 may be adjusted to be the time point T4.

In addition, the timing generator 220 may adjust the time difference between the start time point T1 of the integration time of the pixels having the first phase Phase1 and the start time point T2 of the integration time of the pixels having the second phase Phase2, the time difference between the start time point T2 of the integration time of the pixels having the second phase Phase2 and the start time point T3 of the integration time of the pixels having the third phase Phase3, and the time difference between the start time point T3 of the integration time of the pixels having the third phase Phase3 and the start time point T4 of the integration time of the pixels having the fourth phase Phase4 to be equally the time interval TI1.

Figure 35:
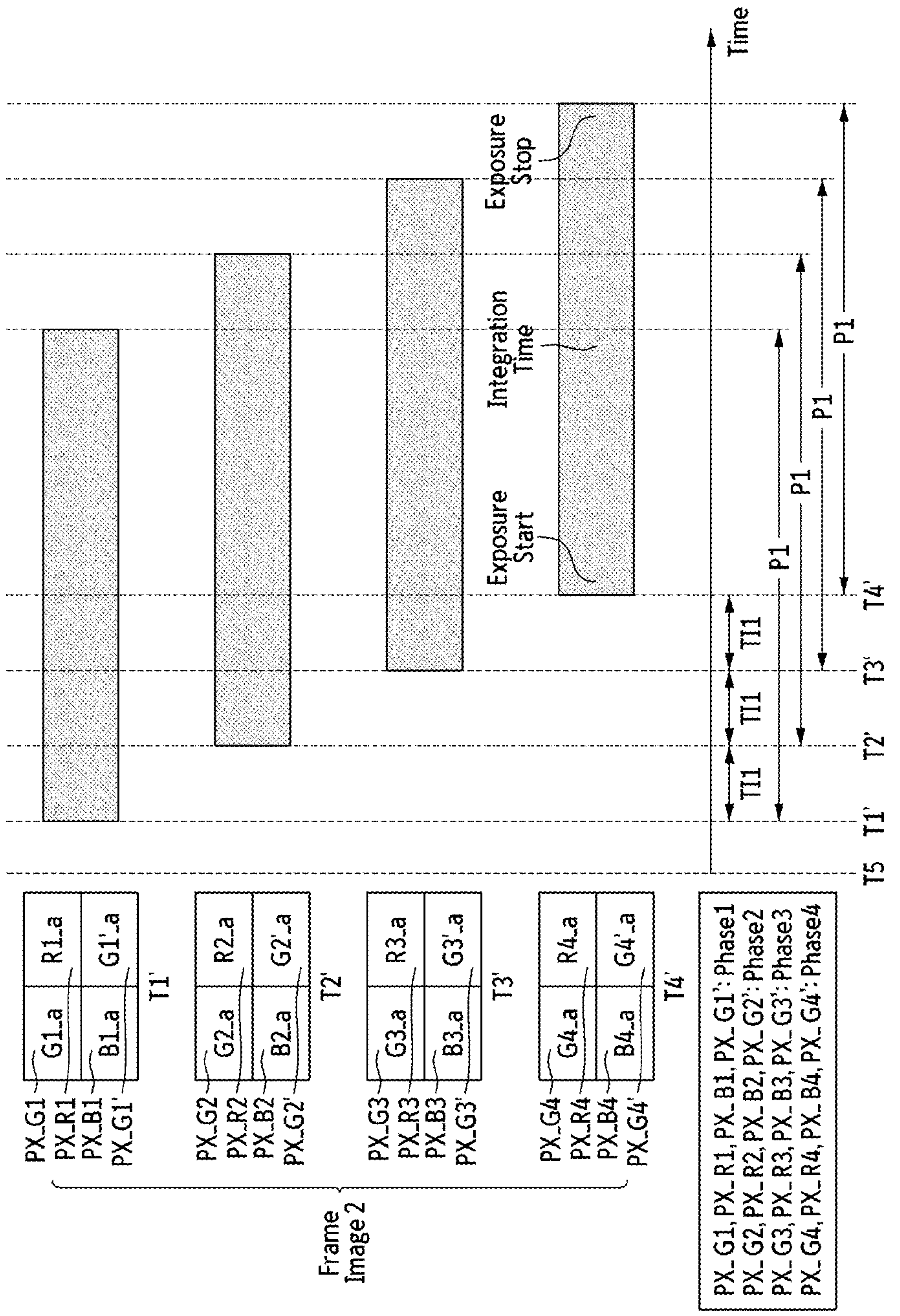
FIG. 35 is a view illustrating a start time point of an integration time for each subpixel array with respect to a second frame image signal of an image sensor according to some embodiments.

FIG. 35 is a view illustrating a start time point of an integration time for each subpixel array with respect to a second frame image signal of an image sensor according to some embodiments.

Referring to FIGS. 33 and 35, the second frame image signal Frame Image2 may be a set of pixel values G1_*a*, R1_*a*, B1_*a*, B1_*a* and G1'_a output from the pixels PX_G1, PX_R1, PX_B1 and PX_G1' from which charges accumulation, that is, integration starts at a time point T1', pixel values G2_*a*, R2_*a*, B2_*a* and G2'_a output from the pixels PX_G2, PX_R2, PX_B2 and PX_G2' from which integration starts at a time point T2', pixel values G3_*a*, R3_*a*, B3_*a* and G3'_a output from the pixels PX_G3, PX_R3, PX_B3 and PX_G3' from which integration starts at a time point T3' and pixel values G4_*a*, R4_*a*, B4_*a*, B4_*a* and G4'_a output from the pixels PX_G4, PX_R4, PX_B4 and PX_G4' from which integration starts at a time point T4'.

In this case, the start time point of the integration time of the pixels PX_G1, PX_R1, PX_B1 and PX_G1' having the first phase Phase1 may be the time point T1'. That is, the time point at which photocharges included in each of the pixels PX_G1, PX_R1, PX_B1 and PX_G1' having the first phase Phase1, which are first read out in each of the subpixel arrays, start to be accumulated may be the same as the time point T1'.

The start time point of the integration time of the pixels PX_G2, PX_R2, PX_B2 and PX_G2' having the second phase Phase2 may be the time point T2' after the time point T1'. That is, the time point at which photocharges included in each of the pixels having the second phase Phase2, which are read out after the pixels having the first phase Phase1 in each of the subpixel arrays are read out, start to be accumulated may be the same as the time point T2'.

As described above, since the plurality of pixels included in the same subpixel array share the analog-to-digital converter, a time difference equivalent to the time interval TI1 may occur between the start time point T1' of the integration time of the pixels PX_G1, PX_R1, PX_B1, and PX_G1' having the first phase Phase1 and the start time point T2' of the integration time of the pixels PX_G2, PX_R2, PX_B2 and PX_G2' having the second phase Phase2.

The start time point of the integration time of the pixels PX_G3, PX_R3, PX_B3 and PX_G3' having the third phase Phase3 may be a time point T3' after the time point T2'. That is, the time point at which photocharges included in each of the pixels having the third phase Phase3, which are read out after the pixels having the second phase Phase2 in each of the subpixel arrays are read out, start to be accumulated may be the same as the time point T3'.

As described above, since the plurality of pixels included in the same subpixel array share the analog-to-digital converter, a time difference equivalent to the time interval TI1 may occur between the start time point T2' of the integration time of the pixels PX_G2, PX_R2, PX_B2 and PX_G2' having the second phase Phase2 and the start time point T3' of the integration time of the pixels PX_G3, PX_R3, PX_B3 and PX_G3' having the third phase Phase3.

The start time point of the integration time of the pixels PX_G4, PX_R4, PX_B4 and PX_G4' having the fourth phase Phase4 may be a time point T4' after the time point T3'. That is, the time point at which photocharges included in each of the pixels having the fourth phase Phase4, which are read out after the pixels having the third phase Phase3 in each of the subpixel arrays are read out, start to be accumulated may be the same as the time point T4'.

As described above, since the plurality of pixels included in the same subpixel array share the analog-to-digital converter, a time difference equivalent to the time interval TI1 may occur between the start time point T3' of the integration time of the pixels PX_G3, PX_R3, PX_B3 and PX_G3' having the third phase Phase3 and the start time point T4' of the integration time of the pixels PX_G4, PX_R4, PX_B4 and PX_G4' having the fourth phase Phase4.

In this case, the timing generator 220 may provide an operation timing control signal to the row driver circuit 210 such that the start time point of the integration time of the pixels PX_G1, PX_R1, PX_B1 and PX_G1' having the first phase Phase1 may be adjusted to be the time point T1', the start time point of the integration time of the pixels PX_G2, PX_R2, PX_B2 and PX_G2' having the second phase Phase2 may be adjusted to be the time point T2', the start time point of the integration time of the pixels PX_G3, PX_R3, PX_B3 and PX_G3' having the third phase Phase3 may be adjusted to be the time point T3', and the start time point of the integration time of the pixels PX_G4, PX_R4, PX_B4 and PX_G4' having the fourth phase Phase4 may be adjusted to be the time point T4'.

In addition, the timing generator 220 may adjust the time difference between the start time point T1' of the integration time of the pixels having the first phase Phase1 and the start time point T2' of the integration time of the pixels having the second phase Phase2, the time difference between the start time point T2' of the integration time of the pixels having the second phase Phase2 and the start time point T3' of the integration time of the pixels having the third phase Phase3, and the time difference between the start time point T3' of the integration time of the pixels having the third phase Phase3 and the start time point T4' of the integration time of the pixels having the fourth phase Phase4 to be equally the time interval TI1.

In addition, the timing generator 220 may adjust the time difference TI1 of the start time of the integration time of the pixels per phase of the first frame image signal Frame Image1 described with reference to FIGS. 32 and 34 to be the same as the time difference TI1 of the start time of the integration time of the pixels per phase of the second frame image signal Frame Image2.

Referring to FIGS. 21 and 34, after the integration time for the pixels PX_G4, PX_R4, PX_B4 and PX_G4' having the fourth phase, which are latest read out among the pixels included in the pixel array, is terminated, the image sensor 200 may transmit the image data IDATA to the image signal processor 100 at a time point T5. In this case, the image data IDATA may be the first frame image signal Frame Image1 of FIGS. 32 and 34.

The image signal processor 100 may generate metadata MD by receiving the image data IDATA and performing image processing for the image data IDATA. The image signal processor 100 may provide the metadata MD to the timing generator control circuit 300, and the timing generator control circuit 300 may generate a control signal CS based on the metadata MD. The timing generator control circuit 300 may provide the control signal CS to the timing generator 220, and the timing generator 220 may generate an operation timing control signal for controlling an operation timing of the components included in the logic circuit area LC of the image sensor 200 and provide the same to the components based on the control signal CS.

Hereinafter, an operation in which the timing generator 220 generates an operation timing control signal and controls a start time of an integration time for each subpixel array for a second frame image signal Frame Image2 will be described with reference to FIG. 36.

Figure 36:
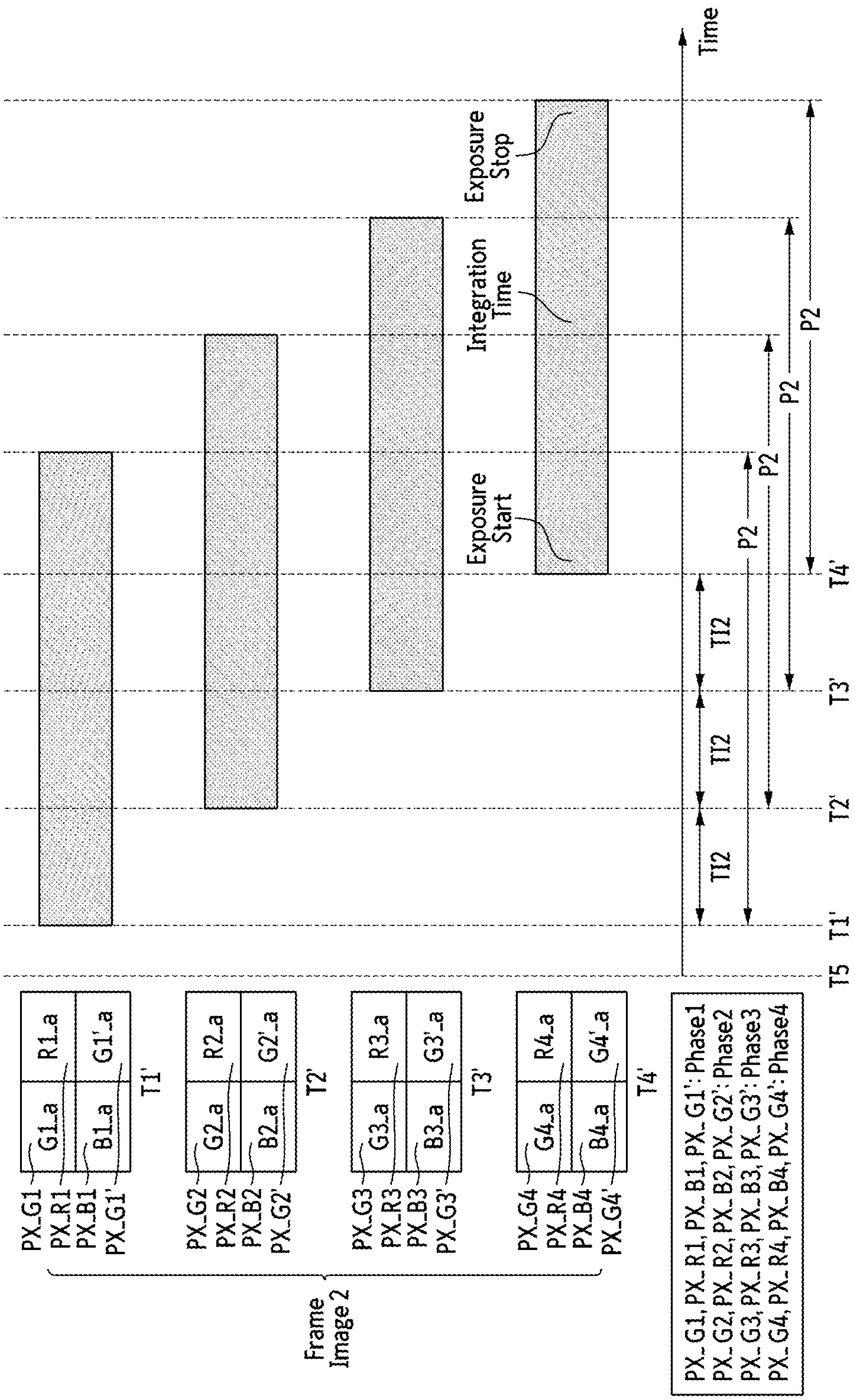
FIG. 36 is a view illustrating an operation of controlling a start time point of an integration time for each subpixel array with respect to a second frame image signal of an image sensor according to some embodiments.

FIG. 36 is a view illustrating an operation of controlling a start time point of an integration time for each subpixel array with respect to a second frame image signal of an image sensor according to some embodiments.

Referring to FIG. 36, the timing generator 220 may adjust the time difference between the start time point T1' of the integration time of the pixels having the first phase Phase1 and the start time point T2' of the integration time of the pixels having the second phase Phase2, the time difference between the start time point T2' of the integration time of the pixels having the second phase Phase2 and the start time point T3' of the integration time of the pixels having the third phase Phase3, and the time difference between the start time point T3' of the integration time of the pixels having the third phase Phase3 and the start time point T4' of the integration time of the pixels having the fourth phase Phase4 to be equally a time interval TI2. In this case, the time interval TI2 may be greater than the time interval TI1 of FIG. 35.

For example, when the metadata MD generated by the image signal processor 100 includes information indicating that the moving speed of the object 400 is not relatively fast, the timing generator control circuit 300 may generate a control signal CS that controls to increase the time difference between the start time points in the integration time between the plurality of pixels included in the same subpixel array and having different phases based on the metadata MD that includes the above information.

The timing generator 220 that has received the control signal CS from the timing generator control circuit 300 may provide, to the row driver circuit 210 based on the control signal CS, an operation timing control signal for increasing the time difference between the start points in the integration time between the plurality of pixels included in the same subpixel array and having different phases, from the time interval TI1 corresponding to when the first frame image signal Frame Image1 is generated, to the time interval TI2 corresponding to when the second frame image signal Frame Image2 is generated. Therefore, the speed at which the image sensor 200 generates the image data IDATA may be slower when the second frame image signal Frame Image2 is generated based on the time interval TI2 than when the first frame image signal Frame Image1 is generated based on the time interval TI1.

As described above, in some embodiments of the disclosure, the image sensor may be driven in a rolling shutter mode for pixels, which share the analog-to-digital converter, among a plurality of pixels included in the pixel array, and may be driven in a global shutter mode for pixels that do not share the analog-to-digital converter but have the same phase due to the same readout order in different pixel arrays.

In this case, the image signal processor may calculate the motion vector of the object by using a feature that the image sensor is driven in a rolling shutter mode for a plurality of pixels included in the same subpixel array, resulting in a time difference at a readout time. In addition, the image signal processor may provide a feedback signal to the timing generator based on the calculated motion vector, and the timing generator may adjust the readout operation timing of the plurality of pixels based on the feedback. Therefore, as described with reference to FIG. 36, when the moving speed of the object 400 is not fast, the sensing operation speed of the image sensor 200 may be adjusted to be relatively slow, such that the image sensor may be driven in a power saving mode. In addition, the difference in the start time point of the integration time between pixels having different phases may be adjusted, such that a frame rate may be adjusted without reducing an overall length (e.g., a length P1 of the integration time in FIG. 35 and a length P2 of the integration time in FIG. 36 may be the same as each other) of the integration time.

Figure 37:
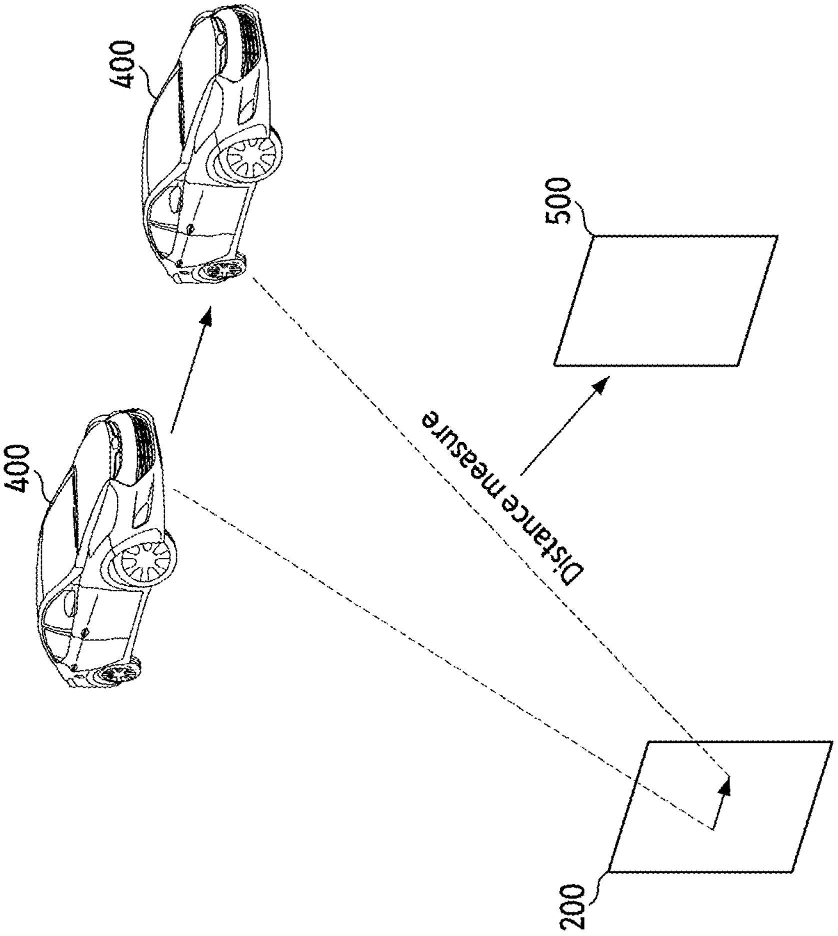
FIG. 37 is a view illustrating an image sensing system according to some embodiments.

FIG. 37 is a view illustrating an image sensing system according to some embodiments.

Referring to FIG. 37, the image sensing system may include an object 400 and an image sensor 200. In this case, the image signal processor described with reference to FIGS. 1 to 36 may be included in the image sensor 200. In some embodiments, the image sensing system may further include a distance measuring device 500. The distance measuring device 500 may measure a distance between the image sensor 200 and the object 400, and may provide information on the measured distance to the image signal processor included in the image sensor 200. The image signal processor may use the provided distance information to extract characteristic information of the object 400, calculate the motion vector of the object 400 based on the extracted characteristic information, and generate metadata based on the calculated motion vector.

Figure 38:
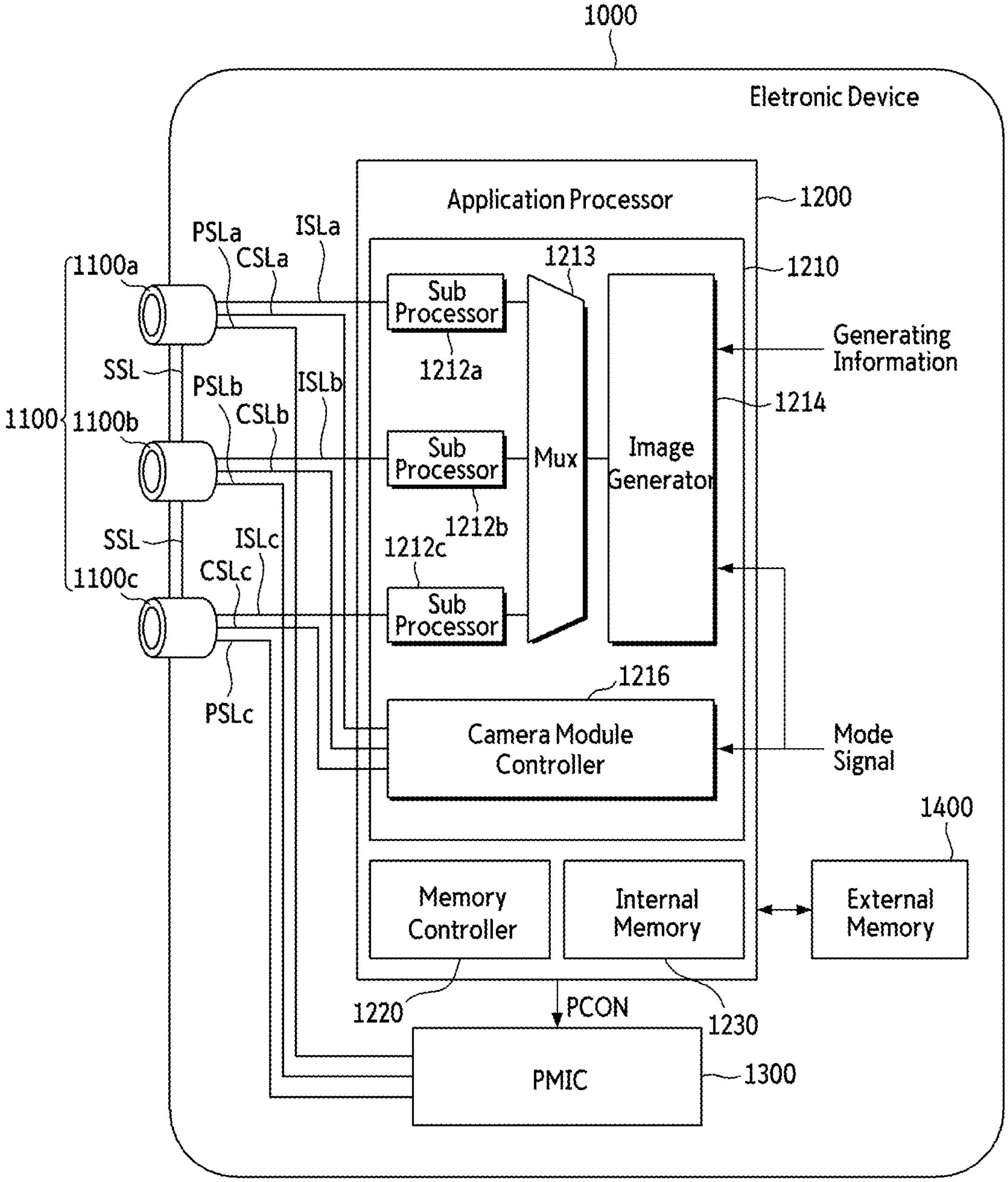
FIG. 38 is a view illustrating an electronic device including a multi-camera module according to some embodiments.
Figure 39:
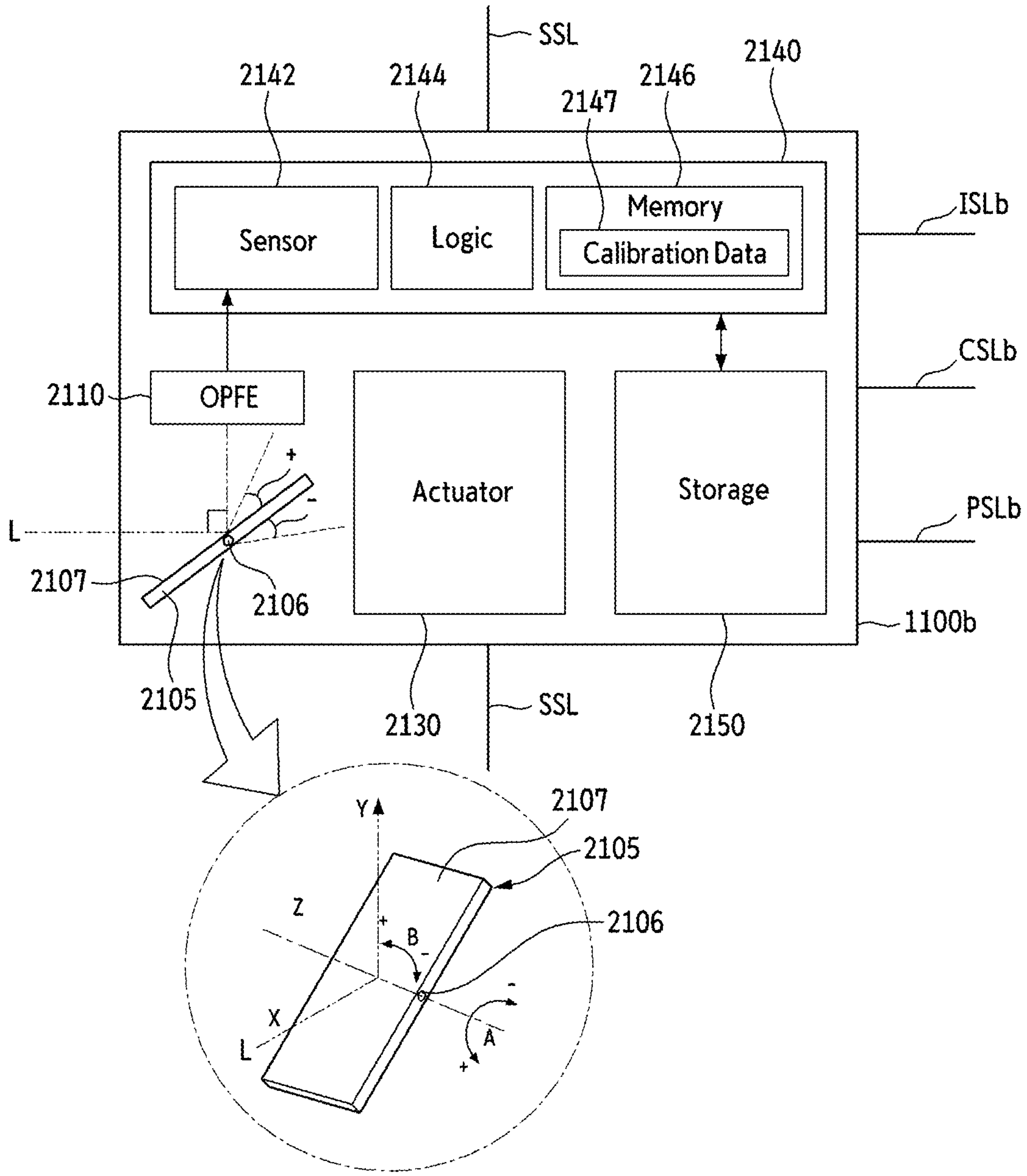
FIG. 39 is a view illustrating a camera module of FIG. 38.

FIG. 38 is a view illustrating an electronic device including a multi-camera module according to some embodiments. FIG. 39 is a view illustrating a camera module of FIG. 38.

Referring to FIG. 38, an electronic device 1000 may include a camera module group 1100, an application processor 1200, a power management integrated circuit (PMIC) 1300, an external memory (or storage) 1400 and a display (not shown).

The camera module group 1100 may include a plurality of camera modules 1100_a_, 1100_b_ and 1100_c_. Although an embodiment in which three camera modules 1100_a_, 1100_b_ and 1100_c_ are disposed is shown in the drawing, the embodiments are not limited thereto. In some embodiments, the camera module group 1100 may be modified to include only two camera modules. Furthermore, in some embodiments, the camera module group 1100 may be modified to include n camera modules (where n is a natural number greater than or equal to 4).

Hereinafter, the camera module 1100_b_ will be described in more detail with reference to FIG. 39, but the following description may be equally applied to other camera modules 1100_a_ and 1100_c_ in accordance with the embodiments.

Referring to FIG. 39, the camera module 1100_b_ may include a prism 2105, an optical path folding element (hereinafter, "OPFE") 2110, an actuator 2130, an image sensing device 2140 and a storage 2150.

The prism 2105 may include a reflective surface 2107 of a light reflective material to modify a path of light L incident from the outside.

In some embodiments, the prism 2105 may change a path of light L incident in a first direction X to a second direction Y perpendicular to the first direction X. In addition, the prism 2105 may change a path of light L incident in the first direction X by rotating the reflective surface 2107 of the light reflective material in a direction A with respect to a central axis 2106 or rotating the central axis 2106 in a direction B to change a path of light L incident in the first direction X to the second direction Y perpendicular to the first direction X. In this case, the OPFE 2110 may also move in a third direction Z perpendicular to the first direction X and the second direction Y.

In some embodiments, a maximum rotation angle of the prism 2105 in the direction A may be less than 15 degrees in a plus (+) A direction and greater than 15 degrees in a minus (−) A direction, but the embodiments are not limited thereto.

In some embodiments, the prism 2105 may move around 20 degrees in a plus (+) or minus (−) B direction or between 10 degrees and 20 degrees in the plus (+) or minus (−) B direction or between 15 degrees and 20 degrees in the plus (+) or minus (−) B direction, wherein the prism 2105 may move at the same angle in the plus (+) or minus (−) B direction or at an almost similar angle in the range of 1 degree or less.

In some embodiments, the prism 2105 may move the reflective surface 2106 of the light reflective material in a third direction (e.g., a direction Z) that is parallel with an extension direction of the central axis 2106.

The OPFE 2110 may include, for example, optical lenses consisting of m groups (where m is a natural number) of optical lens. The m lenses may move in the second direction Y to change an optical zoom ratio of the camera module 1100_b_. When a basic optical zoom magnification of the camera module 1100_b_ is Z and m optical lenses included in the OPFE 2110 move, the optical zoom magnification of the camera module 1100_b_ may be changed to an optical zoom magnification of 3Z or 5Z or greater.

The actuator 2130 may move the OPFE 2110 or an optical lens to a specific position. For example, the actuator 2130 may adjust the position of the optical lens such that the image sensor 2142 is positioned at a focal length of the optical lens for accurate sensing.

The image sensing device 2140 may include an image sensor 2142, a control logic 2144 and a memory 2146. The image sensor 2142 may sense an image of a sensing target by using light L provided through the optical lens. In some embodiments, the image sensor 2142 may include the image sensor 200 described above.

The control logic 2144 may control an overall operation of the camera module 1100_b_. For example, the control logic 2144 may control an operation of the camera module 1100_b_ in accordance with a control signal provided through a control signal line CSLb.

The memory 2146 may store information, which is required for the operation of the camera module 1100_b_, such as correction data (or calibration data) 2147. The correction data 2147 may include information required for the camera module 1100_b_ to generate image data by using light L provided from the outside. For example, the correction data 2147 may include information on a degree of rotation of the prism 2105, information on a focal length, information on an optical axis and the like. When the camera module 1100_b_ is implemented in a form of a multi-state camera in which the focal length changes depending on the position of the optical lens, the correction data 2147 may include information related to auto-focusing and a focal length value for each position (or state) of the optical lens.

The storage 2150 may store image data sensed through the image sensor 2142. The storage 2150 may be disposed outside the image sensing device 2140, and may be implemented in a stacked form with a sensor chip constituting the image sensing device 2140. In some embodiments, the storage 2150 may be implemented as an electrically erasable programmable read-only memory (EPROM), but the embodiments are not limited thereto. The storage 2150 may be implemented by a chip.

Referring to FIGS. 38 and 39, in some embodiments, each of the plurality of camera modules 1100_a_, 1100_b_ and 1100_c_ may include the actuator 2130. Therefore, each of the plurality of camera modules 1100_a_, 1100_b_ and 1100_c_ may include the same or different calibration data 2147 according to an operation of the actuator 2130 included therein.

In some embodiments, one camera module (e.g., 1100_b_) of the plurality of camera modules 1100_a_, 1100_b_ and 1100_c_ may be a camera module in a form of a folded lens that includes the prism 2105 and the OPFE 2110, and the other camera modules (e.g., 1100_a_ and 1100_c_) may be vertical camera modules that do not include the prism 2105 and the OPFE 2110, but the embodiments are not limited thereto.

In some embodiments, one camera module (e.g., 1100_c_) of the plurality of camera modules 1100_a_, 1100_b_ and 1100_c_ may be, for example, a vertical depth camera that extracts depth information by using an Infrared Ray (IR). In this case, the application processor 1200 may generate a 3D depth image by merging image data provided from the depth camera with image data provided from another camera module (e.g., 1100_a_ or 1100_b_).

In some embodiments, at least two camera modules (e.g., 1100_a_ and 1100_c_) of the plurality of camera modules 1100_a_, 1100_b_ and 1100_c_ may have different field of views (or view angles). In this case, for example, optical lenses of at least two camera modules (e.g., 1100_a_ and 1100_c_) of the plurality of camera modules 1100_a_, 1100_b_ and 1100_c_ may be different from each other, but the disclosure is not limited thereto.

Also, in some embodiments, the viewing angles of the plurality of camera modules 1100_a_, 1100_b_ and 1100_c_ may be different from one another. In this case, the optical lenses respectively included in the plurality of camera modules

1100*a*, 1100*b* and 1100*c* may be also different from one another, but the disclosure is not limited thereto.

In some embodiments, the plurality of camera modules 1100*a*, 1100*b* and 1100*c* may be disposed to be physically separate from one another. That is, instead of dividing a sensing area of one image sensor 2142 into divided sensing areas to be respectively used by the plurality of camera modules 1100*a*, 1100*b* and 1100*c*, an independent image sensor 2142 may be disposed inside each of the plurality of camera modules 1100*a*, 1100*b* and 1100*c*.

Referring back to FIG. 38, the application processor 1200 may include an image processing device 1210, a memory controller 1220, and an internal memory 1230. The application processor 1200 may be implemented separately from the plurality of camera modules 1100*a*, 1100*b* and 1100*c*. For example, the application processor 1200 and the plurality of camera modules 1100*a*, 1100*b* and 1100*c* may be implemented separately from each other by separate semiconductor chips.

The image processing device 1210 may include a plurality of sub-image processors 1212*a*, 1212*b* and 1212*c*, an image generator 1214, and a camera module controller 1216.

The image processing device 1210 may include a plurality of sub-image processors 1212*a*, 1212*b* and 1212*c* corresponding to a number of the plurality of camera modules 1100*a*, 1100*b* and 1100*c*.

Image data generated from each of the camera modules 1100*a*, 1100*b* and 1100*c* may be provided to the corresponding sub-image processors 1212*a*, 1212*b* and 1212*c* through image signal lines ISLa, ISLb and ISLc that are separate from one another. For example, the image data generated from the camera module 1100*a* may be provided to the sub-image processor 1212*a* through the image signal line ISLa, the image data generated from the camera module 1100*b* may be provided to the sub-image processor 1212*c* through the image signal line ISLb, and the image data generated from the camera module 1100*c* may be provided to the sub-image processor 1212*c* through the image signal line ISLc. Such image data transmission may be performed by using, for example, a camera serial interface (CSI) based on a mobile industry processor interface (MIPI), but the embodiments are not limited thereto.

In some embodiments, one sub-image processor may be disposed to correspond to the plurality of camera modules. For example, the sub-image processor 1212*a* and the sub-image processor 1212*c* may not be implemented as being separate from each other as shown, but may be implemented as one sub-image processor, and image data provided from the camera module 1100*a* and the camera module 1100*c* may be selected through a selection element (e.g., a multiplexer) or the like and then provided to the integrated sub-image processor.

The image data provided to each of the sub-image processors 1212*a*, 1212*b* and 1212*c* may be provided to the image generator 1214. The image generator 1214 may generate an output image by using the image data provided from each of the sub-image processors 1212*a*, 1212*b* and 1212*c* in accordance with image generating information or a mode signal.

In detail, the image generator 1214 may generate an output image by merging at least a portion of the image data generated from the camera modules 1100*a*, 1100*b* and 1100*c* having different viewing angles in accordance with the image generating information or the mode signal. In addition, the image generator 1214 may generate an output image by selecting any one of the image data generated from the camera modules 1100*a*, 1100*b* and 1100*c* having different viewing angles in accordance with the image generating information or the mode signal.

In some embodiments, the image generating information may include a zoom signal or a zoom factor. Also, in some embodiments, the mode signal may be, for example, a signal based on a mode selected by a user.

When the image generating information is a zoom signal (e.g., a zoom factor) and the camera modules 1100*a*, 1100*b* and 1100*c* have different field of views (or viewing angles), the image generator 1214 may perform different operations depending on a type of the zoom signal. For example, when the zoom signal is a first signal, the image data output from the camera module 1100*a* and the image data output from the camera module 1100*c* may be merged with each other and then an output image may be generated using the merged image signal and image data output from the camera module 1100*b*, which is not used for merging. When the zoom signal is a second signal different from the first signal, the image generator 1214 may generate an output image by selecting any one of the image data output from each of the camera modules 1100*a*, 1100*b* and 1100*c* without performing the image data merging, but the embodiments are not limited thereto. A method of processing image data may be modified and implemented as necessary.

In some embodiments, the image generator 1214 may generate merged image data with an increased dynamic range by receiving a plurality of image data having different exposure times from at least one of the plurality of sub-image processors 1212*a*, 1212*b* and 1212*c* and performing high dynamic range (HDR) processing for the plurality of image data.

The camera module controller 1216 may provide a control signal to each of the camera modules 1100*a*, 1100*b* and 1100*c*. The control signals generated by the camera module controller 1216 may be provided to corresponding camera modules 1100*a*, 1100*b* and 1100*c* through control signal lines CSLa, CSLb and CSLc that are separate from one another.

One of the plurality of camera modules 1100*a*, 1100*b* and 1100*c* may be designated as a master camera (e.g., 1100*a*) in accordance with the image generating information, which includes a zoom signal, or the mode signal, and the other camera modules (e.g., 1100*b* and 1100*c*) may be designated as slave cameras. The information may be included in the control signal and provided to corresponding camera modules 1100*a*, 1100*b* and 1100*c* through the control signal lines CSLa, CSLb and CSLc that are separate from one another.

A camera module operating as a master or a slave may be changed depending on a zoom factor or an operation mode signal. For example, when the viewing angle of the camera module 1100*a* is wider than the viewing angle of the camera module 1100*c* and the zoom factor represents a low zoom magnification, the camera module 1100*c* may operate as a master, and the camera module 1100*a* may operate as a slave. On the contrary, when the zoom factor represents a high zoom magnification, the camera module 1100*a* may operate as a master, and the camera module 1100*c* may operate as a slave.

In some embodiments, a control signal provided from the camera module controller 1216 to each of the camera modules 1100*a*, 1100*b* and 1100*c* may include a sync enable signal. For example, when the camera module 1100*b* is a master camera and the camera modules 1100*a* and 1100*c* are slave cameras, the camera module controller 1216 may transmit a sync enable signal to the camera module 1100*b*. The camera module 1100*b* that has received the sync enable signal may generate a sync signal based on the received sync enable signal and provide the generated sync signal to the camera modules 1100*a* and 1100*c* through a sync signal line SSL. The camera module 1100*b* and the camera modules 1100*a* and 1100*c* may transmit image data to the application processor 2200 in synchronization with the sync signal.

In some embodiments, the control signal provided from the camera module controller 1216 to the plurality of camera modules 1100*a*, 1100*b* and 1100*c* may include mode information according to the mode signal. Based on the mode information, the plurality of camera modules 1100*a*, 1100*b* and 1100*c* may operate in a first operation mode and a second operation mode in relation to a sensing speed.

In the first operation mode, the plurality of camera modules 1100*a*, 1100*b* and 1100*c* may generate an image signal at a first speed (e.g., generate an image signal of a first frame rate), encode the image signal at a second speed higher than the first speed (e.g., encode the image signal at a second frame rate higher than the first frame rate) and transmit the encoded image signal to the application processor 1200. In this case, the second speed may be 30 times or less of the first speed.

The application processor 1200 may store the received image signal, that is, the encoded image signal in the memory 1230, which is provided therein, or the storage 1400 outside the application processor 1200, read and decode the encoded image signal from the memory 1230 or the storage 1400 and display image data generated based on the decoded image signal. For example, a corresponding sub-processor among the plurality of sub-processors 1212*a*, 1212*b* and 1212*c* of the image processing device 1210 may perform decoding, and may also perform image processing for the decoded image signal. For example, the image data generated based on the decoded image signal may be displayed on the display.

The plurality of camera modules 1100*a*, 1100*b* and 1100*c* may generate an image signal at a third speed lower than the first speed (e.g., generate an image signal at a third frame rate lower than the first frame rate) in the second operation mode, and may transmit the image signal to the application processor 1200. The image signal provided to the application processor 1200 may be an unencoded signal. The application processor 1200 may perform image processing for the received image signal, or may store the image signal in the memory 1230 or the storage 1400.

The PMIC 1300 may supply power, for example, a power voltage to each of the plurality of camera modules 1100*a*, 1100*b* and 1100*c*. For example, the PMIC 1300 may supply a first power to the camera module 1100*a* through a power signal line PSLa under the control of the application processor 1200, supply a second power to the camera module 1100*b* through a power signal line PSLb, and supply a third power to the camera module 1100*c* through a power signal line PSLc.

The PMIC 1300 may generate a power corresponding to each of the plurality of camera modules 1100*a*, 1100*b* and 1100*c* in response to a power control signal PCON from the application processor 1200 and may adjust a level of the power. The power control signal PCON may include a power adjustment signal for each operation mode of the plurality of camera modules 1100*a*, 1100*b* and 1100*c*. For example, the operation mode may include a low power mode, and in this case, the power control signal PCON may include information on a camera module operating in the low power mode and a set power level. The levels of power provided to each of the plurality of camera modules 1100*a*, 1100*b* and 1100*c* may be the same as or different from each other. Also, the level of power may be dynamically changed.

Although example embodiments of the disclosure have been described with reference to the accompanying drawings, the disclosure is not limited to the above embodiments, but may be implemented in various different forms. A person skilled in the art may appreciate that the disclosure may be practiced in other concrete forms without changing the technical spirit or characteristics of the disclosure. Therefore, it should be appreciated that the embodiments as described above is not restrictive but illustrative in all respects.

What is claimed is:

1. An image sensing system comprising:

a pixel array including a first subpixel array and a second subpixel array, the first subpixel array including a first pixel and a second pixel and the second subpixel array including a third pixel and a fourth pixel;

a first column line connected to the first pixel and the second pixel;

a second column line connected to the third pixel and the fourth pixel, the second column line being different from the first column line;

a readout circuit connected to the first and the second column lines, the readout circuit being configured to receive output signals from the first pixel, the second pixel, the third pixel, and the fourth pixel and configured to output image data based on the output signals; and an image signal processor configured to generate metadata related to a motion vector of an object included in the image data by performing an interpolation based on the image data, wherein the readout circuit is configured to read out pixels connected to the first column line in an order of the first pixel and the second pixel, and is configured to read out pixels connected to the second column line in an order of the third pixel and the fourth pixel, wherein a start time point of an integration time for the first pixel is the same as a start time point of an integration time for the third pixel, and wherein a start time point of an integration time for the second pixel is the same as a start time point of an integration time for the fourth pixel.

2. The image sensing system of claim 1, wherein the image signal processor is configured to generate a first image signal and a second image signal by dividing the image data per same phase, wherein the first image signal includes a first pixel value output by sensing a light that has passed through a first color filter corresponding to the first pixel and a second pixel value output by sensing a light that has passed through a second color filter corresponding to the third pixel, and wherein the second image signal includes a third pixel value output by sensing a light that has passed through a third color filter corresponding to the second pixel and a fourth pixel value output by sensing a light that has passed through a fourth color filter corresponding to the fourth pixel.

3. The image sensing system of claim 2, wherein the image signal processor is configured to generate a third image signal by upscaling the first image signal and generate a fourth image signal by upscaling the second image signal, wherein the third image signal includes a fifth pixel value between the first pixel value and the second pixel value, wherein the fifth pixel value corresponds to the second pixel, wherein the fourth image signal includes a sixth pixel value between the third pixel value and the fourth pixel value, and wherein the sixth pixel value corresponds to the third pixel.

4. The image sensing system of claim 3, wherein the image signal processor is configured to extract a characteristic information of the object by comparing the third image signal with the fourth image signal, and is configured to calculate the motion vector of the object based on the extracted characteristic information.

5. The image sensing system of claim 4, wherein the metadata related to the motion vector of the object includes information on at least one of a speed, an acceleration, or a moving path of the object.

6. The image sensing system of claim 2, wherein the image signal processor is configured to generate a third image signal by performing a phase correction for the first image signal and is configured to generate a fourth image signal by performing a phase correction for the second image signal, wherein a phase of the first pixel in the third image signal and a phase of the second pixel in the fourth image signal are the same as each other, and wherein a phase of the third pixel in the third image signal and a phase of the fourth pixel in the fourth image signal are the same as each other.

7. The image sensing system of claim 6, wherein the image signal processor is configured to extract a characteristic information of the object by comparing the third image signal with the fourth image signal, and is configured to calculate the motion vector of the object based on the extracted characteristic information.

8. The image sensing system of claim 7, wherein the metadata related to the motion vector of the object includes information on at least one of a speed, an acceleration, or a moving path of the object.

9. The image sensing system of claim 1, wherein the readout circuit includes a first analog-to-digital converter connected to the first column line, the first analog-to-digital converter being configured to convert a signal of the first column line into a first digital signal, and wherein the readout circuit further includes a second analog-to-digital converter connected to the second column line, the second analog-to-digital converter being configured to convert a signal of the second column line into a second digital signal.

10. The image sensing system of claim 1, further comprising:

a timing generator configured to generate an operation timing reference signal of the pixel array; and a timing generator control circuit configured to receive the metadata from the image signal processor and configured to generate a control signal for controlling the timing generator based on the metadata.

11. The image sensing system of claim 10, wherein the timing generator is configured to receive the control signal from the timing generator control circuit and is configured to adjust, based on the received control signal, an interval between the start time point of the integration time for the first pixel and the start time point of the integration time for the third pixel and an interval between the start time point of the integration time for the second pixel and the start time point of the integration time for the fourth pixel.

12. The image sensing system of claim 11, wherein the timing generator is configured to adjust, based on the received control signal, the interval between the start time point of the integration time for the first pixel and the start time point of the integration time for the third pixel and the interval between the start time point of the integration time for the second pixel and the start time point of the integration time for the fourth pixel to be increased.

* * * * *